United States Patent [19]

Cailliau et al.

[11] 4,251,773
[45] Feb. 17, 1981

[54] METHOD AND APPARATUS FOR EXPLORATION OF GEOLOGICAL FORMATION TILT IN BOREHOLES

[75] Inventors: Michel Cailliau, Asnieres; Philippe Vincent, Versailles, both of France

[73] Assignee: Schlumberger Technology Corporation, New York, N.Y.

[21] Appl. No.: 915,424

[22] Filed: Jun. 14, 1978

[30] Foreign Application Priority Data

Jun. 24, 1977 [FR] France .................. 77 19486

[51] Int. Cl.$^3$ .................. G01V 3/18; G01V 3/24
[52] U.S. Cl. .................. 324/347; 324/367; 324/374
[58] Field of Search .................. 324/1, 10, 13, 347, 324/367, 374

[56] References Cited

U.S. PATENT DOCUMENTS

| | | | |
|---|---|---|---|
| 2,176,169 | 10/1939 | Doll | 324/1 |
| 2,669,690 | 2/1954 | Doll | 324/10 |
| 2,786,178 | 3/1957 | Doll | 324/1 |
| 2,930,969 | 3/1960 | Baker | 324/10 |
| 2,963,641 | 12/1960 | Nanz | 324/13 |
| 3,060,373 | 10/1962 | Doll | 324/1 |
| 3,065,405 | 11/1962 | Jarrett | 324/1 |
| 3,136,942 | 6/1964 | Schuster | 324/1 |
| 3,243,695 | 3/1966 | Roark et al. | 324/1 X |
| 3,363,719 | 1/1968 | Venghiattis . | |
| 3,376,950 | 4/1968 | Grine . | |
| 3,406,776 | 10/1968 | Henry . | |
| 3,423,671 | 1/1969 | Vezin | 324/1 |
| 3,521,154 | 7/1970 | Maricelli | 324/10 |
| 3,564,914 | 2/1971 | Desai et al. . | |
| 3,685,158 | 8/1972 | Planche . | |
| 3,712,414 | 1/1973 | Crawford . | |
| 3,775,739 | 11/1973 | Vogel . | |
| 3,794,976 | 2/1974 | Mickler . | |
| 4,097,801 | 6/1978 | Freeman et al. . | |

FOREIGN PATENT DOCUMENTS

| | | | |
|---|---|---|---|
| 685727 | 5/1964 | Canada | 324/10 |
| 495867 | 11/1938 | United Kingdom . | |
| 833990 | 5/1960 | United Kingdom . | |
| 908467 | 10/1962 | United Kingdom . | |
| 928583 | 6/1963 | United Kingdom . | |
| 1071416 | 6/1967 | United Kingdom . | |
| 1071414 | 6/1967 | United Kingdom . | |

OTHER PUBLICATIONS

Beck et al., "*Reservoir Evaluation . . . In South Texas*", SPWLA Eighteenth Annual Logging Symposium, Jun. 5-8, 1977, p. 1-25.
Bricaud et al., "*Continuous Dipmeter Survey*", Publication at Fifth Petroleum Congress, Jun. 1959, pp. 1-10.
Nederlov et al., "*A Three Dimensional Vector Method . . .*", Geologie en Mijnbouw, vol. 50(6), 1971, pp. 725-732.

*Primary Examiner*—Gerard R. Strecker
*Attorney, Agent, or Firm*—Stephen L. Borst

[57] ABSTRACT

Method and apparatus are disclosed for investigating lateral characteristics of an earth formation penetrated by a borehole. Substantially identical measurement transducers are mounted in a fixed separation, side-by-side relationship on a pad adapted for sidewall application. As a pad traverses the borehole, measurement signals are produced corresponding to the same formation investigation conducted along two side-by-side paths on the borehole wall. The signals are recorded and provide an indication of lateral changes between the side-by-side paths. By comparing the signals with varying depth displacements, the best likeness and corresponding displacement are determined and provided as an indication of lateral inclination of the formation. The best likeness indicates a lateral formation homogeneity characteristic and the displacement the inclination of the lateral characteristic between the side-by-side paths. In a multipad embodiment, the lateral characteristic determination is made for each pair of side-by-side paths around the borehole and combined to provide the dip of lateral characteristics which persist to some degree around the borehole. When side-by-side transducer pads are employed on conventional dipmeters, twice as many dipmeter signals are produced, allowing more detailed correlation of signal features corresponding to vertical changes in formation characteristics, such as occur between bed boundaries, and thus improves the formation dip determination.

28 Claims, 11 Drawing Figures

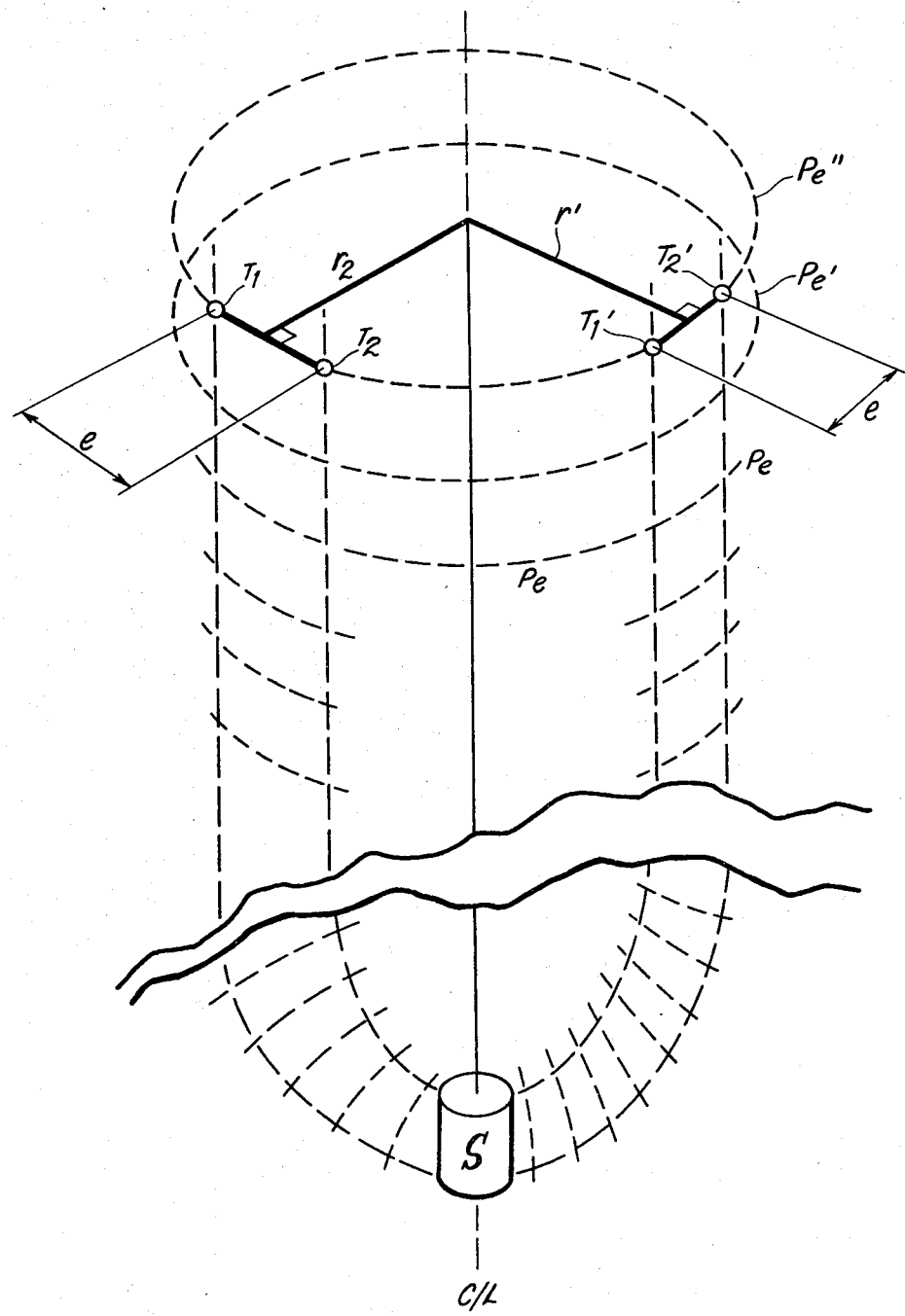

FIG. 6
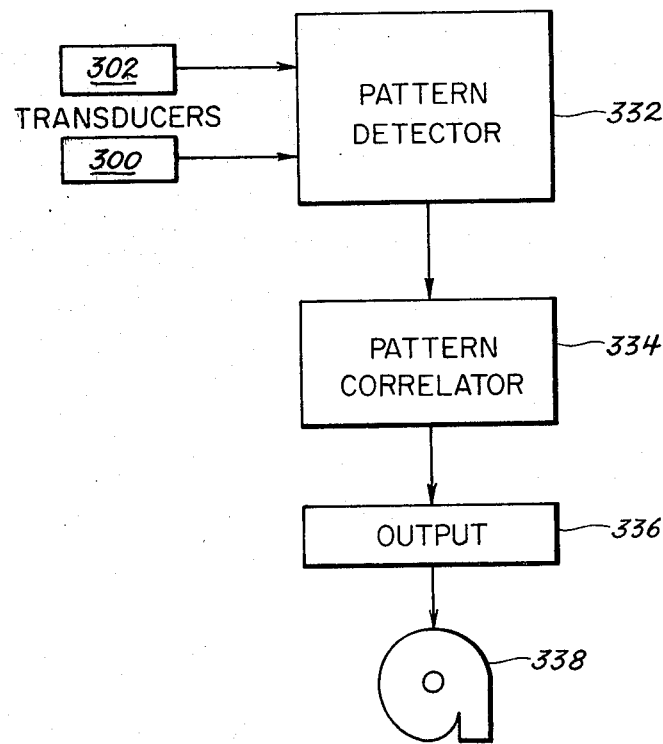
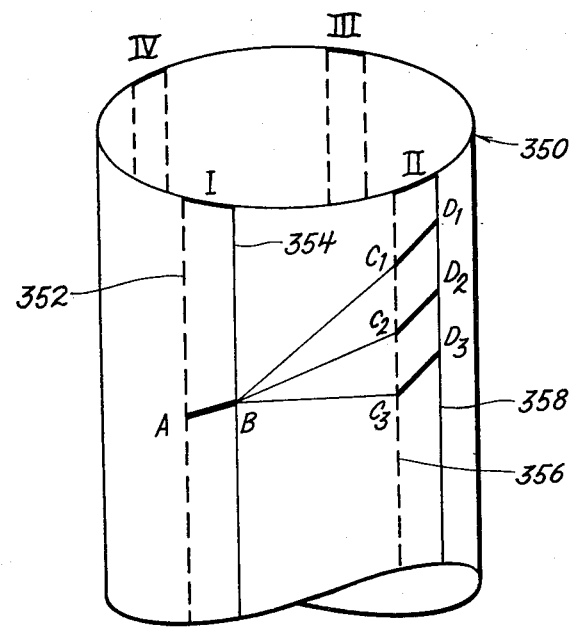
FIG. 8

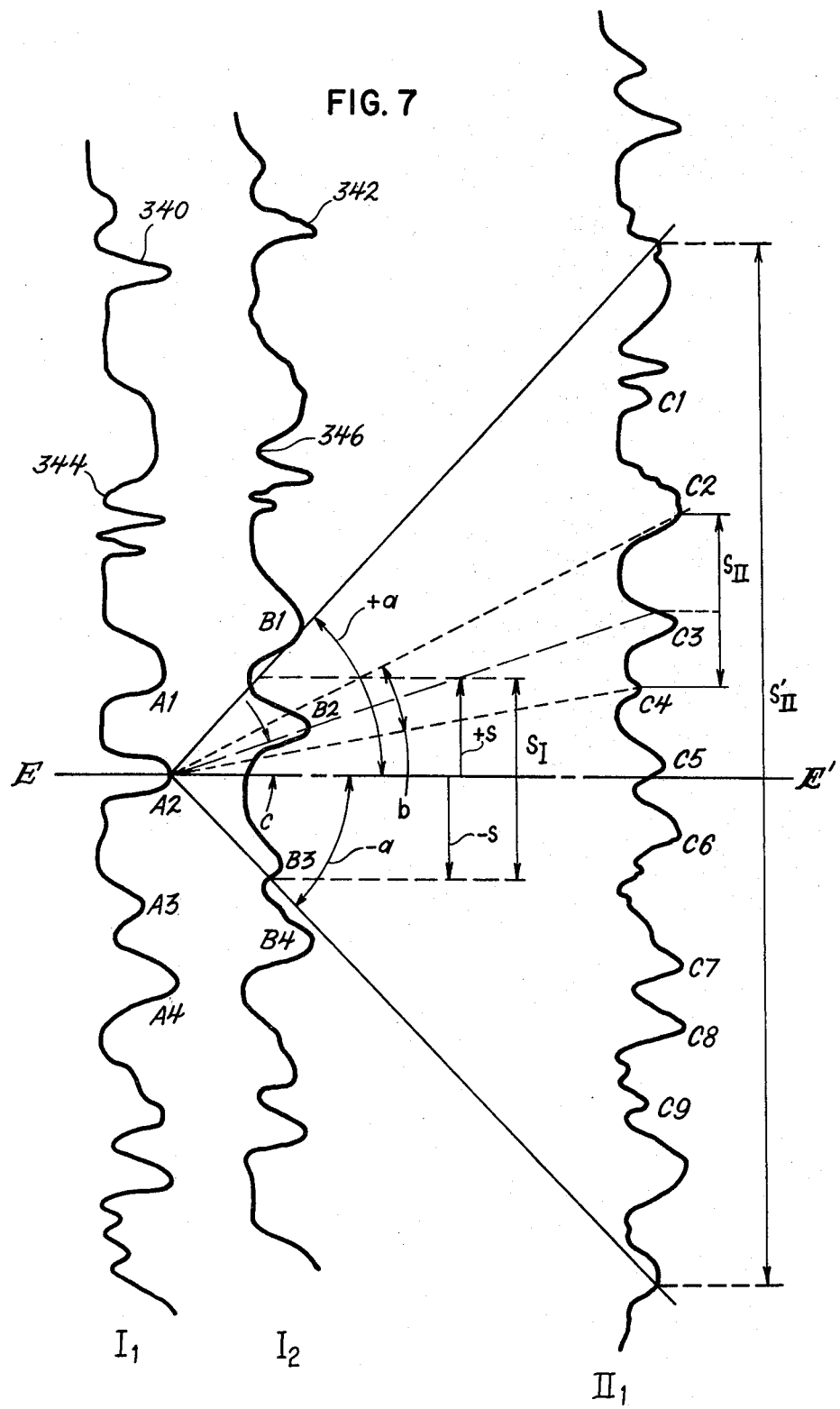

METHOD AND APPARATUS FOR EXPLORATION OF GEOLOGICAL FORMATION TILT IN BOREHOLES

FIELD OF THE INVENTION

This invention relates to method and apparatus for the exploration of boreholes and more particularly for investigating lateral characteristics of formations penetrated by the borehole. Lateral formation characteristics correspond to changes in directions generally parallel to the plane of deposition for the formation. The directions are usually normal to the axis of the borehole. Lateral changes are in contrast to changes in the vertical direction along the borehole, which is the usual object of borehole logging devices. By way of example, lateral changes are implied where substantially identical and properly conducted local investigations of formation characteristics at one depth in a borehole produces different measurements when conducted at different azimuths around the borehole. Illustrative examples of lateral characteristics are inclined fractures, tilted depositional planes, and other oriented features affecting directional investigations such as preferential or statistical oriented elongated grains, pores or other microstructures. The invention also relates to method and apparatus for determining the dip of earth layers traversed by a borehole.

BACKGROUND OF THE INVENTION

It is known that the sedimentary portion of the earth's surface is made up of successive layers or beds which generally do not have a constant thickness and exhibit a certain dip, e.g., an inclination with respect to a horizontal plane. This inclination may be defined as the angle formed by a line in the plane of the considered layer having the greatest slope in relation to a horizontal plane. It is understood that the dip of formation layers penetrated by a borehole constitutes extremely important information in petroleum prospecting. Such information is useful for evaluating the chances of obtaining hydrocarbons from a borehole, for establishing the nature of adjacent geological structures and for choosing the location of new boreholes.

Dip can be determined from resistivity logs which have lateral separation provided by using measurement electrodes placed on four pads carried by a dipmeter probe which are applied against the borehole wall at points corresponding to two perpendicular diameters. Typically, each pad contains a measurement electrode or transducer which conducts an investigation of formation characteristics immediately adjacent the pad. Thus, the investigations take place along four paths distributed at about 90° intervals around the circumference of the borehole. When the probe is moved vertically through the borehole, four logs are obtained and recorded, usually in the form of sampled electrical signals which indicate by features such as peaks, dips and bumps, the presence of bedding planes along the respective vertical paths. The respective offset needed to bring corresponding signal features into depth alignment makes it possible to determine the dip of the formation in relation to the axis of the dipmeter probe. To determine the offset required between two signals, conventional correlation techniques or pattern recognition between possibly corresponding features on each signal may be employed.

In the prior art dipmeter probes used as described above, it is important that each of the pads maintain their expected position against the borehole wall. Since many boreholes are not circular in cross-section but often resemble elipses or off-center circles with different diameters, each pad is attached to the main probe body in a manner which will allow it to seek the desired position against the borehole wall as independently as possible. However, since dip information is desired, it is required to restrain the relationship between or independently measure the diameters between opposing pairs of pads. It is for this reason that four-pad dipmeters usually include the recording of two orthogonal diameter calipers. The diameter information from both calipers is required in order to determine dips corresponding to formation layers. The corresponding pad-to-pad distances between at least three pads located at approximately 90° circumferential separations around the borehole is combined with offsets between signals obtained from the three pads.

Unfortunately, signals obtained from circumferential segments separated by 90° or more (for the three-pad dipmeter, the separation corresponds to 120°) are not as alike as one would assume for several reasons. First, the pad supporting a given measurement electrode may not maintain wall contact in a consistent manner. This is due to the fact that the wall of the borehole is not uniformly smooth, but exhibits roughness, bumps and cavities. It is also known that the rubbing of the pads on the borehole wall is not uniform along the borehole or from one pad to another in the same section of the borehole. Further, for boreholes deviated substantially from vertical, the weight of the tool tends to collapse the mechanical mechanism attempting to apply all the pads against the side of the hole to the extent that the pad lying on the topmost side of the hole will float away from the borehole wall. This results in substantial distortions, both of the signal obtained from the floating pad relative to other pads in proper position against the wall, and in the diameter appropriate for use with the signal. Thus, there are several non-formation characteristic related factors which tend to introduce noise or change the nature of electrical signals obtained from the different pads of the dip-meter probe.

One attempt to enhance dipmeter signals over noise is described in U.S. Pat. No. 3,521,154 which issued July 21, 1970 to J. J. Maricelli. As shown therein in FIGS. 1 and 2, two substantially identical electrodes are placed on the same pad, one above the other and separated by a fixed vertical distance $d_1$. The signal from the uppermost electrode (leading when the probe is being withdrawn from the borehole) is memorized for a depth difference corresponding to $d_1$ and multiplied with the signal obtained from the lower or trailing electrode to produce a new signal for the pad having a better signal-to-noise ratio. Since the two electrodes are aligned vertically and investigate the same slice of formation along the same path on the borehole wall, but do this same investigation at different times, this technique provides a new pad signal compensated for noise occurring at different random times.

In an embodiment disclosed in FIGS. 5A and 5B of the U.S. Pat. No. 3,521,154 and described at column 7 beginning at line 13, three substantially identical electrodes are placed on the same pad, two of which are vertically displaced and a third horizontally and vertically displaced relative to the first two. The signals from the leading electrodes are depth shifted so that all three signals representative of the same depth in the borehole are present simultaneously. Then as described in column 8, line 1, the three signals are multiplied together. Because of the vertical and now horizontal displacements between the three electrodes, any noise brought about by inconsistencies with time and vertical movement or by actual differences in the formation over the small horizontal displacement will be reduced in the resulting signal product. It is important to remember that the depth shifting between these common pad signals is fixed and corresponds to the fixed vertical distance between the electrodes and that the depth shifted signals are continuously multiplied together to form a single new signal, irrespective of the properties of the individual signals. Thus inconsistencies between the signals from the electrodes are considered as noise due to the borehole environment, such as localized caves, and thus cancelled out.

While it has long been known that sedimentary formations vary to considerable extent in the direction of deposition; i.e., in their vertical direction, and attempts have been made to measure such vertical anisotropy, it has been recently discovered that some formations are anisotropic in the horizontal direction as well. The true characteristics of many important petroleum bearing formations can be expected to vary from one point on the circumference on the borehole wall to another point at the same depth. The presence of such horizontal anisotropy, particularly for characteristics which control fluid flow, as for example permeability, must be considered when evaluating reservoir potentials, since these directional properties affect the way fluids enter into the borehole or may be injected from the borehole into the formation, as for example, during flooding operations.

In some cases, the horizontal anisotropy is characteristic of the formation deposition, as for example, in the case of foreset bedding or elongated sand grains which are preferentially oriented by air or water currents at the time of deposition. Other characteristics which change in the horizontal or lateral direction are introduced after deposition such as highly elongated pores developed by solution along stress lines in carbonates or inclined fractures resulting from flexural distortions in formations that are too brittle to elastically yield to these forces. Since the presence of these types of lateral changes in formations often has a profound effect upon the accumulation or producibility of petroleum deposits, a knowledge of the presence and if possible, the orientation of these changes in subsurface formations, is important.

Prior art devices which attempt to measure lateral characteristics of formations include apparatus designed to conduct investigations of formation characteristics in the lateral direction. Typically, a transmitting transducer will introduce a signal at one point on the circumference of the borehole which is subsequently received by a receiving transducer at another point on this circumference with the points typically separated by 90° or more. In order to conduct investigations which propagate signals through each 90° quadrant, both transmitting and receiving transducers are mounted on separate pad-like projections, with each pad typically containing one transmitting and one receiving transducer mounted one above the other. One apparatus of this type is disclosed in U.S. Pat. No. 3,794,976 issued on Feb. 26, 1974 to B. E. Mickler. In the embodiment described in this patent, acoustic type transducers are employed to conduct a circumferentially directed investigation of acoustic characteristics of the formation between four transmitter and receiving pairs spaced over 90° quadrants. Signals obtained over one quadrant may be compared with the signals obtained over other quadrants to detect lateral changes in formation from quadrant to quadrant, such as intervening vertical fractures.

Additional apparatus have been described in the prior art for conducting measurements alternately along paths parallel to the vertical axis of the borehole and radially around the borehole. For example, U.S. Pat. No. 3,564,914 issuing Aug. 12, 1968 to K. P. Desai, et al. discloses a pad configuration for measuring both differential acoustic and resistivity measurements in the vertical and the radial directions. Of particular interest, in FIG. 6 thereof is disclosed a five-transducer arrangement allowing the vertical axis investigation embodied in pad 18 as shown in FIG. 2 to be conducted along two mutually perpendicular axes, e.g., in the vertical and radial directions along the borehole wall, as described at the bottom of column 4 bridging through column 5. It is important to note that housings 24 or 26 are capable of performing either as electrical or acoustic transducers. As electrical transducers, current is emitted from an electrode in housing 24, returning to the backplate 66 of pad 18 and the potential difference between electrodes mounted in two housings 26 produced as the measurement signal. In this manner, the electrical measurement investigates the difference in the measured characteristic between electrodes along a line common to measurement housings 26 and current housing 24. Similarly, in an acoustic investigation, transducers in housing 24 transmit energy which is received by transducers in housings 26.

These arrangements produce a single signal corresponding to the difference in signals between housings 26 as the signal propagates through the formation along a line between the housings. This line may be either fixed in a horizontal or vertical direction, or both as illustrated in FIG. 6. By nature of such differential measurements conducted along two points on a line also containing the signal source, it is inherent that a signal, whether acoustic or electrical or otherwise in nature, will be different between two measurement points because of signal gradients in that direction, since the signal is also introduced at another nearby point along that same line. These measurement signal differences will exist solely due to geometrical spreading and attenuation losses, for example, and would occur even if the formation were homogeneous. Thus, signals representative of differential measurements between identical transducers lying along lines corresponding to gradients in the signals do not readily lend themselves to indicating changes in characteristics between the transducers because the signals are inherently different.

It is an object of the present invention to produce signals which readily indicate changes in characteristics of the formation occurring between measurement transducers and which have no inherent differences under homogeneous formation conditions.

A deviation from the differential measurement, while retaining the attributes of a circumferential measurement, is suggested in U.S. Pat. No. 2,963,641 issued Dec. 6, 1960 to R. H. Nanz. In addition to providing a description of some types of lateral characteristics of earth formations of interest in the present application, this patent illustrates in FIG. 2 a short spacing acoustic measurement between one transmitter 21 and one receiver 22 mounted on each of four pads in a side-by-side relationship. However, since only one transducer is a measurement transducer, only one signal is produced per pad and it is necessary to compare signals produced from different pads separated by 90° or more of circumference to determine the presence of and/or direction of any lateral change. The ability to fix the distance corresponding to the investigation to that between the side-by-side transducers overcomes the uncertainty in path length present in other circumferential measurements conducted from one pad to another, but however, still includes the uncertainties inherent to differences in the manner different pads are applied to the borehole wall. This problem, inherent in pad-to-pad signal comparisons, limits the ability to distinguish changes corresponding to measurement conditions from pad to pad from changes in the lateral formation characteristics.

It is an additional object of the present invention to provide signals for investigating lateral changes in formation characteristics which are essentially free of effects of changes in circumferential pad-to-pad measurement conditions.

Another problem present in producing signals for comparison is illustrated in the application of a so-called "speed electrode" employed with more sophisticated dipmeter probes. In this application, two identical electrodes similar to those shown in the aforementioned U.S. Pat. No. 3,521,154 are displaced one above the other on a common pad. However, in this case the two signals produced from each electrode are not combined to produce a single signal with a superior signal-to-noise ratio but are correlated one with another to determine an apparent displacement which should compare with the actual displacement between the two electrodes. A difference in these displacements indicates a variation in the speed of the pad during the period between when the speed electrode and the subsequent measure electrode pass the same feature on a borehole wall.

These variations in speed are common to pad type probes and appear to represent a sort of skipping or loading and unloading of the friction between the pads and the borehole wall. The speed variation is commonly known as "yo-yo" and introduces an uncertainty both in the actual signal and in the sampling of signals acquired at different vertical points along the borehole, since such sampling is usually determined at intervals either related to the cable motion at the surface or small increments of time, but in either case not directly related to the actual motion of the pad along the borehole. Thus, signals produced at different times, corresponding to different points along the borehole in the direction of movement, introduce when compared, an uncertainty as to whether the differences observed between these signals is related to an actual change in the formation characteristics or to a change induced because of the sampling of the signals at two different times.

Accordingly, it is a further object of the present invention to produce signals which may be sampled at substantially the same times and same position of the probe as it moves along the borehole. This provides the advantage that such signals will be free of time varying sampling uncertainties.

The conventional dipmeter probe provides four substantially identical measurement electrodes on different pads. The linkage employed with the more sophisticated of these probes provides that electrodes on each of these pads remain substantially in the same plane and that this plane remains normal to the axis of the dipmeter probe which is generally parallel if not coincident to the axis of the borehole.

It has been previously recognized that it would be advantageous to have more than the four circumferentially spaced signals now available for dipmeter correlation. When the lateral spacing between signal transducers becomes large, as is the case for the four pad probe in large radius boreholes, even where formations vary only slightly in lateral characteristics, it becomes difficult to correlate with certainty a feature clearly present on one signal to a possibly corresponding feature present on a signal from a pad located 90 degrees or more around the borehole. A similar problem occurs when bedding planes intersect the borehole at high angles (due either to high angle dip or boreholes highly deviated from vertical) because one pad may be looking at the bedding planes at one angle while the next pad looks at these planes at a substantially different angle, as for example, one along the strike and the other across the bedding planes. Here the variation in bedding plane intersection angles over 90 degrees leads to substantial differences in signal features for the same bedding plane. If an intermediately spaced signal could be provided, the lateral variation could be expected to be less over the smaller spacing and the transition of a given feature much easier traced from one signal to the next around the borehole.

However, providing such desirable intermediate signals, i.e., signals closer than 90 degrees of circumference or from measurement transducers spaced along the borehole wall at distances less than the minimum radius of the borehole (a circular borehole wall is 2 $\pi$ or 6 plus radii in circumference) is not as easy as it might appear. The size of the mechanical linkage and pad supports limits the number of pads that can be placed in a single common-plane array and still operate in a small diameter borehole. Tandem arrays of three or four pads with each array in different planes spaced vertically one above the other and rotationally offset from each other, might appear to be a way of providing signals at circumferential separations less than the radius of the borehole. However, when the effect of "yo-yo" motion and the resulting sampling distortions discussed above for vertically spaced electrodes are considered, particularly for the substantially larger vertical spacings necessary for tandem arrays; along with uncertain rotation rates making the rotational offset variable (rotation could be such that pads in one tandem array track, rather than offset, pads in the other array), the tandem pad array approach does not solve the problem of producing simultaneous signals from more than four fixed spacing points around the borehole circumference.

It is therefore a still further object of the present invention to provide signals from measurement transducers located substantially in the same plane and spaced around the borehole at fixed spacings less than the minimum borehole radius.

It has been apparent from optical records of prior art dipmeter signals that substantial differences exist in the nature of signals obtained from different quadrants of the borehole. Signals obtained from opposing pads (spaced at 180°) often resemble one another more than signals obtained from adjacent pads (typically separated by 90°) thus, providing an indication that the formation characteristics in one direction appear to be different from the characteristics in another direction. Thus, if not due to pad measurement problems, these differences would indicate that lateral anisotropy must be present.

However, there has been no successful technique for directly indicating the degree of lateral anisotropy or horizontal homogeneity.

For example, recent use of four-pad dipmeter signals optically recorded in a special presentation adapted for comparing signals from adjacent quadrants has facilitated the identification of vertical fractures. This technique and presentation is described in an article entitled, "Reservoir Evaluation of Fractured Cretaceous Carbonates in South Texas", by J. Beck, A. Schultz and D. Fitzgerald, published in the SPWLA 18th Annual Logging Symposium, June 5—8, 1977 *TRANSACTIONS*. While this special presentation is helpful, it does not provide direct assessment of the degree of lateral homogeneity of formation conditions in a particular direction. For example, significant differences between signals from two adjacent pads may exist when a substantially vertical fracture appears in front of one of the pads reducing the resistivity signal obtained from that pad. This technique generally indicates lateral change only to the extent that the fractures present immediately adjacent one pad do not exist immediately adjacent other pads providing signals in the other quadrants of the borehole. It would be advantageous to have a technique which automatically provided the lateral or horizontal homogeneity or lateral changes of a local point immediately adjacent each pad, rather than between pads scattered around the borehole at distances which vary with the borehole diameter.

Accordingly, another object of the present invention is to continuously provide an automatic indication of the horizontal or lateral changes in characteristics of an earth formation at local points around the borehole penetrating the formation.

It is a still another object of the present invention to produce signals indicative of lateral characteristics of an earth formation without reliance on the similarity of measurement conditions from one pad to another or variations in distance between adjacent or opposed pads which would affect the determination of changes in lateral characteristics of the formation between these pads.

In accordance with the invention, method and apparatus for investigating lateral characteristics of an earth formation penetrated by a borehole are provided. The invention comprises producing first and second signals respectively from substantially identical first and second measurement transducers mounted on the same pad adapted for application against the borehole wall. These transducers are mounted alongside each other in a plane normal to the direction of movement along the borehole and at a fixed center-to-center separation which is less than the radius of the borehole. As the pad and transducers are moved along borehole, the transducers provide side-by-side paths at a fixed separation on the borehole wall which is independent of the borehole diameter. Each measurement transducer is employed to provide generally identical investigations representative of formation characteristics immediately adjacent the respective transducer and along the side-by-side paths. In this manner, the signals differ when formation characteristics change laterally between the transducers. The signals produced from the side-by-side path investigations are recorded in the manner which is adapted to comparing their likeness at a given depth to determine changes in lateral characteristics of the formation between the side-by-side paths.

In a further embodiment, first and second signals produced over a small depth interval are automatically compared to provide an indication of lateral characteristics between these signals. Comparisons are made with various depth displacements between the signals to determine the best likeness and corresponding depth displacement. A function of the best likeness and corresponding displacement is then recorded as an indication of a lateral characteristic of the earth formation between the side-by-side paths for the depth interval.

Signals produced in accordance with the invention from two closely spaced side-by-side transducers mounted on a common pad may be compared with far more certainty than signals obtained from separate pads with substantial and perhaps varying distances therebetween. The common pad embodiment employed by the invention assures the same operating environment for both transducers used to produce the compared signals. In contrast, it is well known that signals obtained from separate pads may vary, not of reason by changes in formation characteristics, but by reason of changes in the manner in which the different pads contact the borehole wall. Thus, a detailed comparison of two signals acquired from presumably identical measurement electrodes but located on separate pads introduces the uncertainty as to whether differences in the two signals correspond to lateral changes in characteristics of the formation or in differences related to the different pads and their position on the borehole wall. Comparison of signals obtained from side-by-side transducers on a common pad advantageously removes this uncertainty.

In the preferred embodiment the transducers take the form of substantially identical electrodes symmetrically mounted on a pad. The pad takes the form of a focussing device focussing each electrode in the same manner to assure substantially the same investigation of the formation immediately adjacent the electrode. The preferred investigation corresponds to a resistivity measurement of the type typically employed in resistivity dipmeter logging. However, in contrast with that practiced in dipmeter signal processing, the signals produced for comparison in accordance with the invention are obtained from side-by-side electrodes mounted in a fixed relation on the same pad whereas in dipmeter logging, the signals processed to obtain dips are obtained from different pads, which by nature of the type of linkage employed, have a variable distance therebetween, and by nature of the number of pads, are spaced circumferentially at 90° or 120° intervals about the borehole circumference. As previously explained, even when a given signal feature can be traced around the borehole from one signal to another, there is no assurance that the difference between the features on the different pad signal is representative of either lateral change in formation characteristics or representative of differences in pad to borehole wall contact.

The preferred comparison technique employed in accordance with the invention comprises successive correlations between the two signals which have a known and fixed distance between the signals sources with each correlation considering a different interval on at least one of the signals. Each such correlation provides a likeness factor. The best likeness factor and the corresponding displacement are determined. Functions of the best likeness and corresponding displacement are recorded as indications of lateral changes in characteristics of the earth's formation between the side-by-side paths for the compared signal interval.

Apparatus is disclosed for automatically and continuously comparing two signals produced as the pad bearing probe is moved along the borehole. The resulting best likeness factors and corresponding displacements may be continuously recorded versus borehole depth along with the orientation of the pad relative to magnetic North, for example.

In accordance with a multi-pad embodiment of the invention, pads containing pairs of side-by-side transducers may replace the pads normally employed for dipmeter apparatus. In this manner, the typical four-pad dipmeter may now produce eight dipmeter signals each corresponding to a different path on the borehole well. This doubling of the number of correlatable signals and the corresponding decrease in the distance between the paths for such signals provides a considerable advantage for dip determination.

For example, the best likeness and corresponding displacement determined between each pair of side-by-side transducer signals may be advantageously employed to determine the dip of the formation. Signals from a pad exhibiting poor likeness and therefore indicating changing lateral characteristics may be disqualified from the dip determination. If the likeness factor determined from side-by-side signals is good, both or either of these signals may be used for dip determination with assurance that the signals represent laterally correlatable formation characteristics. Further, the displacement corresponding to the best likeness between signals from one side-by-side transducer pad may be used to guide displacement determinations between signals from different pads to determine the dip of the formation, since laterally homogeneous features found between two side-by-side paths may be used to project the position of lateral features on adjacent paths. Still further, the displacements or lateral inclinations determined between best likeness features on side-by-side transducer signals obtained from several pads constructed in accordance with the invention may be combined to provide the dip of the laterally extending formation characteristics.

These and other advantages and objects of the invention can be understood from the following detailed description of method and apparatus for investigating lateral changes in characteristics of an earth formation described in conjunction with accompanying drawings wherein:

BRIEF DESCRIPTION OF THE DRAWINGS

FIG. 1A is a simplified diagram showing the general relationship between signal source and measurement transducers;

FIG. 6 represents schematically the means for implementing another variant of the invention; and FIGS. 7A, 7B and 8 illustrate methods for determining the dip of earth formations in accordance with the invention.

Figure 1B:
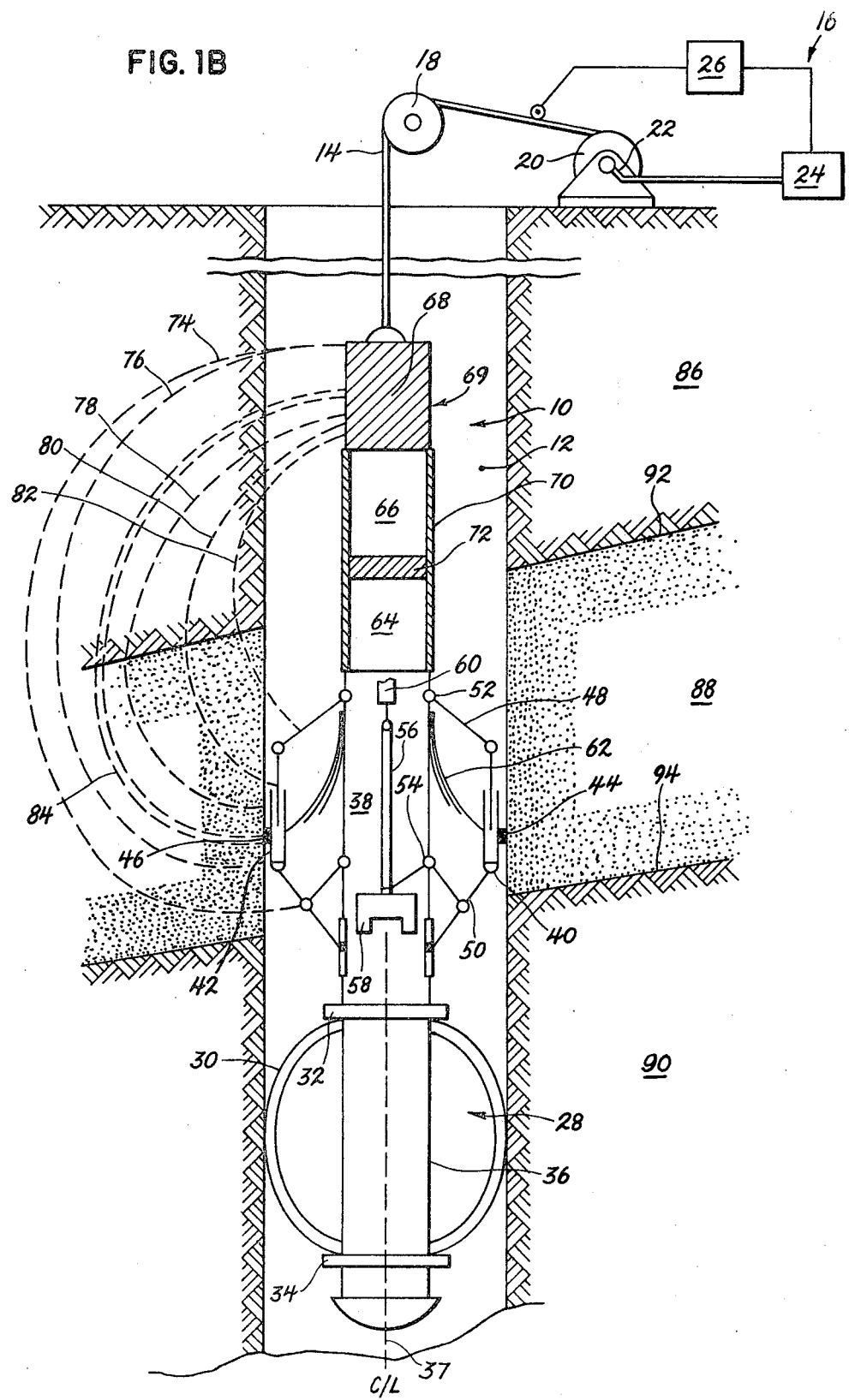
FIG. 1B is a simplified diagram of an apparatus for electrical investigation of the earth's formations, and more particularly, for determining the dip of subsurface formations penetrated by a borehole.

An important consideration, irrespective of the type of measurement employed, is that each transducer conducting the side-by-side investigations producing the measurement signals has substantially the same relationship to the source signal used, and preferably, both use a common signal source, focussing system or any other arrangement affecting the response of the measurements, such as the distance from the signal source, the source path length, both in the mud and formation, and depth of penetration of the investigation, for example.

The signal source may be either on the same pad as the measurement transducers, as for example, symmetrically disposed around or on the same side of the measurement transducers or a common source may be used which is located off the pad at some distance therefrom and preferably centered along the borehole axis such that a reasonable approximation of a plane wave distribution normal to the borehole axis is valid at the position of the measurement transducers.

For example, if a common acoustic source (transmitter) is employed, it should be centrally located as shown in U.S. Pat. No. 3,712,414 issued to G. J. B. Crawford on Jan. 23, 1973. When using such a remote source, it should be located at several borehole diameters away from the measurement transducers so that any near field transmitter effects disappear before the signal reaches the proximity of the measurement transducers. At this distance, the source signal should provide a plane wave free from non-formation related gradients propagating in the formation in a direction parallel to the borehole axis.

FIG. 1A illustrates this concept graphically. A signal source S is located along the centerline C/L of the borehole. Near the source S, the equi-potential or equi-pressure lines are known to be likely distorted both by near field source and borehole characteristics. However, at some distance above source S, as shown in FIG. 1A, by planar equi-signal lines $P_e$, the signal may be regarded as a plane wave propagating away from source S parallel to the borehole centerline C/L. Thereafter, local distortion in plane wave surfaces $P_e$ develop in response to differences in local formation characteristics such that these differences are reflected in signals received at two substantially identical transducers $T_1$ and $T_2$ at a fixed separation normal to a radius r of the borehole and in a plane $P_e'$ or $P_e''$. In this manner, signals produced at $T_1$ or $T_2$ would be identical if the formation characteristics are homogeneous and different if local differences in these characteristics are present in the immediate vicinity of $T_1$ or $T_2$. The same would be true for a pair of side-by-side measurement transducers such as shown at $T_1'$ and $T_2'$ located at a different radial distance r' from the borehole centerline C/L.

It is also important to remember that while a high degree of likeness between signals obtained from a first pair of side-by-side measurement transducers such as $T_1$ and $T_2$, shown in FIG. 1A, may indicate the formation is locally homogeneous between these transducers, it does not always follow that a similar likeness and homogeneity would be indicated simultaneously between a second set of side-by-side transducers $T_1'$ and $T_2'$. This would require that the homogeneity present immediately adjacent one pair extend horizontally around the borehole to the second pair which would not be the case if a homogeneous layer was inclined.

For example, consider a formation whose strike line is parallel to a line connecting measurement transducers $T_1$ and $T_2$, and which dips in the direction of radius r at an angle such that a substantially different part of the formation is present opposite the second pair of side-by-side measurement transducers $T_1'$ and $T_2'$, as shown in FIG. 1A. Further consider the formation as anisotropic in a direction normal to its dipping bedding planes such that each pair of side-by-side measurement transducers produce signals corresponding to a different layer adjacent the respective pairs of transducers. In such cases the plane of the equi-signal lines $P_e$ may also become inclined parallel to the bedding planes and to the centerline of the borehole. In such case, one pair of side-by-side transducers may be investigating at a level indicated by plane $P_e''$ and a second pair at a level more approaching $P_e'$.

When the equi-signal lines are inclined relative to the line connecting a pair of side-by-side transducers, it will be apparent that each measurement transducer in the pair will be operating at a different signal level at a given instant as the transducers are moved along the borehole wall. Of course, each transducer does pass through the same equi-signal plane but now at different times with the difference in times being related to the local inclination in a plane parallel to the borehole centerline C/L and containing both side-by-side transducers.

While the description provided relative to FIG. 1A has been general in regard to the nature of the specific type of source and measurement transducers employed, for the sake of clarity, the rest of the description will be in terms of electrode-type transducers and the preferred resistivity measurements. Considerations similar to those described for the electrodes and associated resistivity measurements will be familiar to those skilled in other types of transducers and associated measurements and therefore will not be described herein.

In order to obtain practically identical measurement conditions, a first and second signal are recorded by means of two identical measurement electrodes placed side-by-side of the same pad of the logging probe. These two electrodes are advantageously in a plane which is substantially perpendicular to the centerline of the probe which is maintained by means of centralizers and the like in the proximity of the centerline of the borehole or at least parallel thereto. In this manner, the previously discussed inaccuracies introduced through variations in probe speed relative to time or cable measurements used in sampling may be eliminated. Side-by-side distance or separation between the two transducer electrodes is small compared to the horizontal dimensions of the borehole and particularly compared with the smallest radius of the borehole if the borehole cross section is of the type previously discussed resembling superimposed circles of different radii. Side-by-side separation is fixed for a given pad but of course may be varied in accordance with degree of fineness desired in the analysis of formations. As an example of the side-by-side separation for typical boreholes, the separation between the two electrodes shown in FIG. 1A as e would be on the order of three centimeters (3 cm).

Whatever type of transducers or measurements are employed, care should be taken to insure that measurement conditions are substantially identical for each of the side-by-side measurement transducers, such that differences between signals produced at a given depth from the two side-by-side transducers can come only from differences in local formation characteristics investigated by the transducers.

The invention allows a finer analysis of a given earth formation. Comparison of the two side-by-side signals, and in particular their correlation, gives an indication of the degree of homogeneity of characteristics for this formation. As an example, if the investigated layer is a conglomerate; i.e., stones, amalgamated with each other, the lateral homogeneity of the layer is very low as lateral changes will be frequent. This will be reflected in the fact that two series of signals produced by such side-by-side electrodes on the same pad are dissimilar, since there is a good chance that, when one electrode is immediately adjacent a stone, the other electrode is not and vice versa. In other words, correlation of the two signals does not reveal events which correspond to only one of the two signals. Similarly, if a layer investigated simultaneously by the two electrodes is very homogeneous in the lateral direction, the two signals may vary considerably with depth but will be practically alike. This will be reflected in the measured degree of lateral homogeneity which will be high. A large number of events which correspond from one signal to the other produces by correlation a result corresponding to a high likeness. Events which do not correspond from signal to signal produce a correspondingly low likeness result.

A conventional dipmeter has three pads, and generally four. When two identical electrodes are mounted on each of the pads, in conformity with the invention, it can be seen that by comparing the likeness of the signals produced by one pad at a given depth, the resistivity signals are very dissimilar, for example, and thereby indicate a lateral heterogeneity of the characteristics of the formation. Such an indication of lateral heterogeneity at one pad would imply that a correlation could not be expected between signals from this pad and signals from other pads for the alignment plane for which the heterogeneity was confirmed.

However, in accordance with the invention, it is possible to offset the two side-by-side signals for likeness comparisons at different lateral inclinations and choose the best likeness for a series of such inclinations. Since this inclination corresponds to the best homogeneity of the measured formation characteristic, this plane can be used to predict the position where the most homogeneous characteristic might be expected to appear on signals from other pads. In the absence of such a predicted position, it might not be possible to correlate with certainty a weak feature present on the signals obtained from the various pads present on a conventional dipmeter. Thus, a dipmeter with pads constructed in accordance with the invention allows a very fine analysis of the layers traversed by the borehole and, consequently, can reveal the presence of very thin layers, for example, layers having a thickness on the order of a centimeter.

The same characteristic of formations immediately adjacent side-by-side transducers and reflected in variations in the amplitude of the measured signals produced from one pad as a function of depth: a peak or a hollow, for example, may reoccur in a given zone on signals produced from other pads. Since the characteristic reoccurs, what is involved is a lateral bedding feature of the formation, as for example, a clay layer. Thus, a feature having a high degree of likeness in side-by-side signals has the type of lateral homogeneity associated with bedding from which formation dips may be determined. In contrast, the same feature (peak, hollow, etc.) revealed by correlation of two signals produced by means of the two side-by-side electrodes on the same pad, may not be found again on all other pad signals, but only on one or several pads. If a high degree of likeness indicated an apparently lateral homogeneous feature should have been found but was not found, it is possible to determine that the feature was interrupted between pads, as occurs with a high angle fracture, for example.

According to another feature of the invention, two signals produced by means of the two electrodes located side-by-side on the same pad make it possible to measure the lateral inclination of homogeneous layers, even if only seen by two side-by-side electrodes on one pad. This lateral inclination is measured in a plane passing through the two electrodes and parallel to the borehole centerline. With reference to FIG. 1A, this plane is perpendicular to the borehole radius r, parallel to the centerline C/L, and includes the pair of side-by-side transducers, $T_1$ and $T_2$, for example. The lateral inclination is provided by comparing side-by-side signals produced by the two measurement electrodes which are now separated by a fixed distance e since they are located on the same pad. No diameter or caliper measurement is required. The lateral inclination of formation characteristics causes the side-by-side signals to be offset with respect to depth. This depth offset and fixed lateral separation between the electrodes allows the measurement of the lateral inclination in the plane including the side-by-side electrodes and extending along the direction of movement on the borehole wall.

FIG. 1B represents a dipmeter 10 capable of moving in a well 12 generally filled with drilling mud, by means of an electrical cable 14 connected to surface equipment 16. Cable 14 runs over a pulley 18 located over the borehole opening and winds on a drum 20. Commutation means 22, such as a slip-ring and brush assembly on the drum shaft, make it possible to connect cable 14 electrically with instruments located on the surface. A computer 24 is electrically interfaced to the cable in a manner capable of receiving signals transmitted from dipmeter 10 and also of sending control and calibration signals to the downhole dipmeter probe. Computer 24 is programmed so as to be able to process the logging signals and, in particular, for automatically carrying out the comparing of the side-by-side signal operations so as to continuously provide, among other things, the information relating to lateral formation characteristics, such as the lateral homogeneity and lateral inclination of layers adjacent a single pad, as well as extend this technique to other pads and provide the dip of layers traversed by two or more pads.

Figure 4:
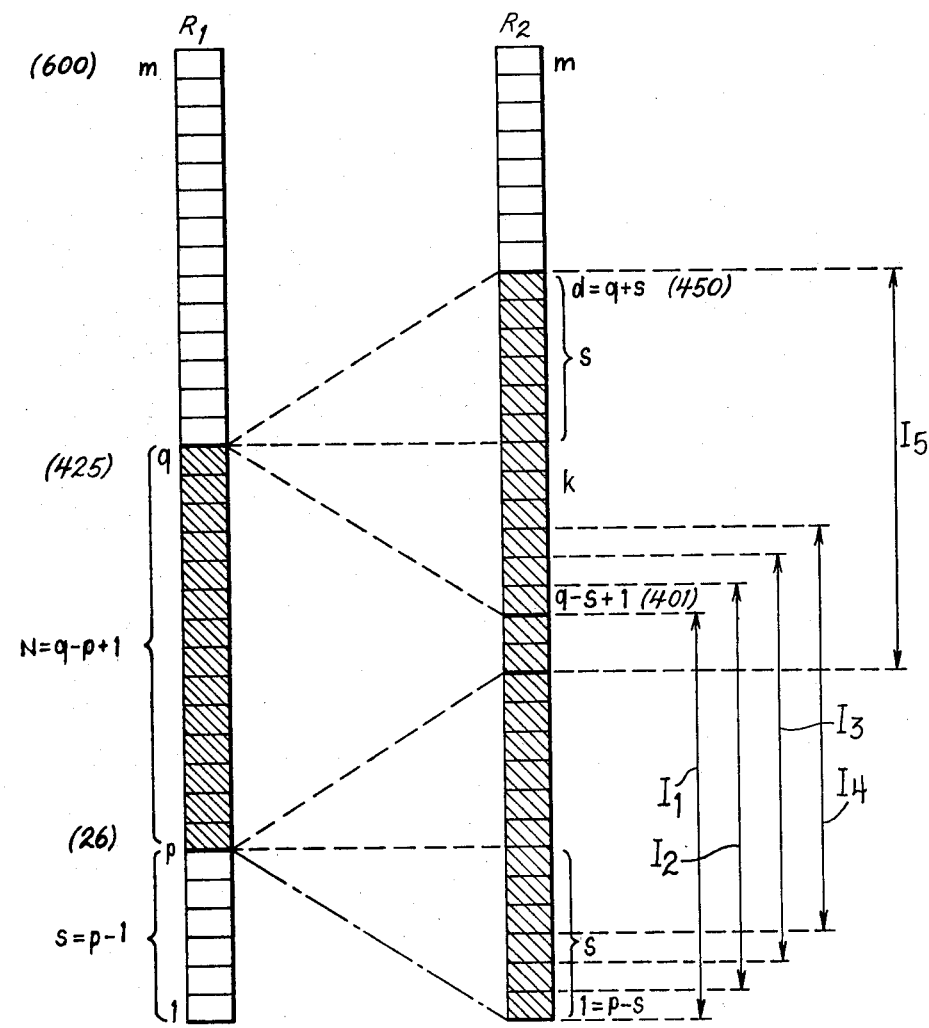
FIG. 4 illustrates a variant of the invention.
Figure 5:
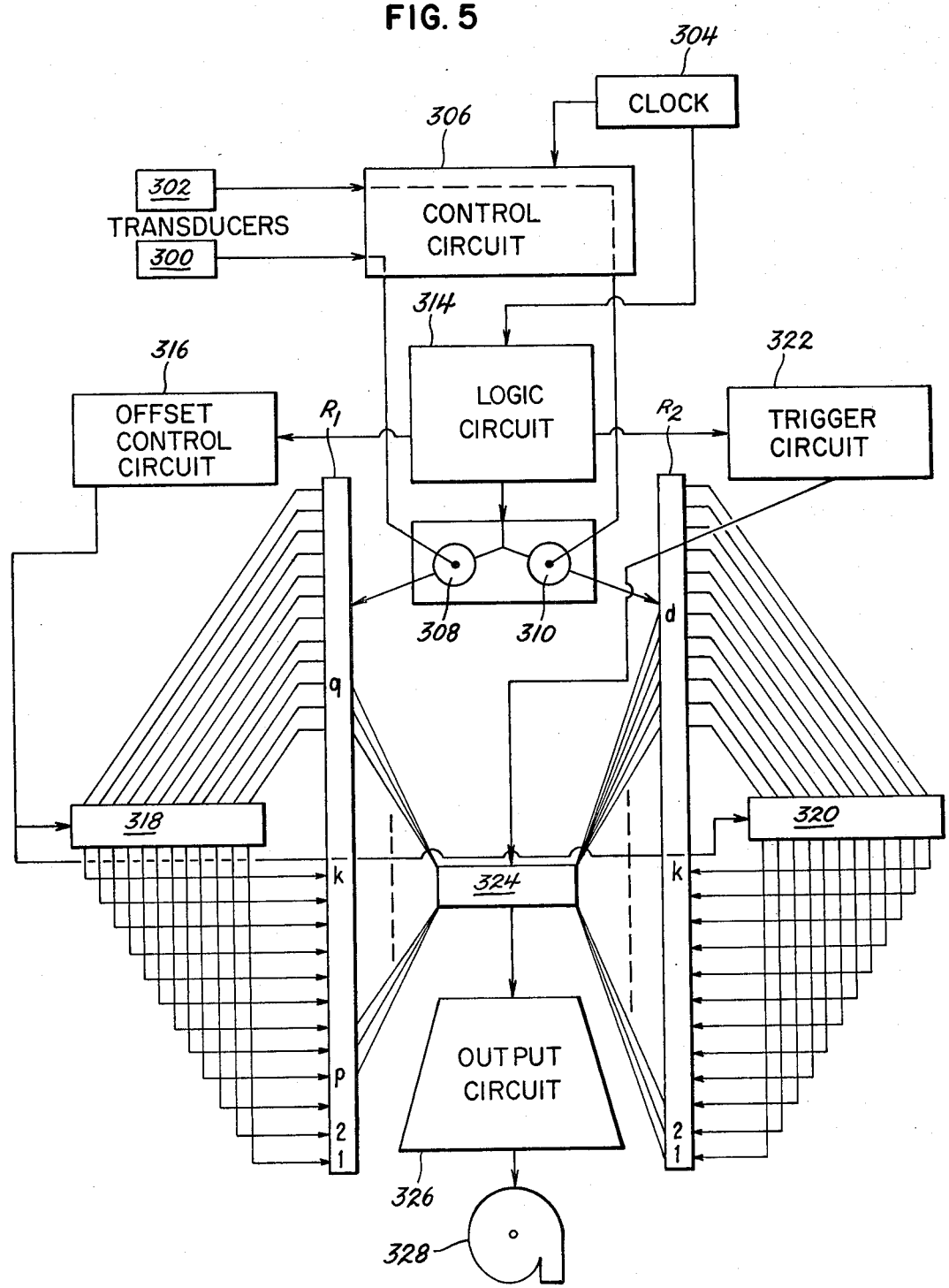
FIG. 5 represents schematically a means for implementing the variant illustrated in FIG. 4.

Specific functions performed by computer 24 can be also performed by suitable alternative means, in particular, means such as those represented in FIGS. 4 and 5. Signals characteristic of the depth of probe 10 in the borehole may be processed by separate circuits such as illustrated by circuit 26, which is connected to the computer, although not necessarily external thereto. Surface equipment 16 can, for example, be like that described in U.S. patent application Ser. No. 356,250, filed May 1, 1973 by Francis M. Eaton now abandoned in favor of continuing application Ser. No. 961,340 filed Nov. 16, 1978.

Dipmeter 10 includes a centering device 28 of a known type composed chiefly of several arched metal blades 30, generally three or four in number, riding along the walls of the borehole. Two rings 32 and 34 are connected to the ends blades 30, at least one of these rings being capable of sliding along a central sleeve 36. A logging probe could also include a second centering device at its upper end to assist in keeping the axis or centerline of probe 10 approximately coincident with the borehole center.

Section 38 of probe 10 includes the pads. Only pads 40 and 42 mounted diametrically opposite each other on the probe body member are shown to simplify FIG. 1B. The dipmeter can include four identical pads, the two pads not shown in FIG. 1B being located at the two ends of a diameter perpendicular to and in the same plane as the diameter of pads 40 and 42. These diameters are located in the same horizontal plane perpendicular to the axis of the dipmeter. Such an arrangement for conventional pads is described, for example, in U.S. Pat. Nos. 3,423,671 issued to A. M. Vezin on Jan. 21, 1969 and 3,685,158 issued to J. Planche on Aug. 22, 1972.

It should be noted that a dipmeter constructed in conformity with the invention need include only two pads, each having two side-by-side measurement electrodes. These two pads should be on different diameters which need not be perpendicular to each other but should be at known angular separations of 30° to 150° for example. To provide signals corresponding to the same probe velocity it is preferred that both pads be in the same plane perpendicular to the direction of movement intended for the probe. Each pad includes at least two side-by-side measurement electrodes. The four resistivity signals obtained by means of these two pads are sufficient for determining the dip of a considered formation when utilized in accordance with the invention. In FIG. 1B, pads 40 and 42 show in the view given, only a single electrode per pad, electrodes 44 and 46 respectively. The side-by-side counterparts of electrodes 44 and 46 do not show in FIG. 1B because they are advantageously in substantially the same plane which is perpendicular to the longitudinal axis 37 of the probe body member.

Each pad is connected to probe 10 by arms 48 and 50 swiveling around fixed points 52 and 54. The probe body ends of arms 48 and 50 are linked by a metal rod 56 to a piston 58 hydraulically controlling the opening and closing of the arms and to a potentiometer 60, making it possible to continuously determine the distance between the pad and the axis 37 of the probe. The arrangement of the swiveling arms is such that electrodes 44 and 46 may move along the borehole wall, changing the distance between both electrodes and axis 37 as required, while remaining at all times in a common plane perpendicular to axis 37.

Spring 62 shown in FIG. 1B consists of several stacked metal blades rigidly fixed to the probe body member and which movably contact the back of the pad. The spring applies the pad against the wall of the borehole with a substantially constant force. Each pad and its associated arm operate independently of each other. While only one is shown in FIG. 1B, each pad has its own arms 48 and 50 and potentiometer 60, making it possible to continuously determine the dimensions of the borehole along the radial directions corresponding to each pad. In the case of the four-pad probe, these directions correspond to two perpendicular diameters which make it also possible to determine the position of longitudinal axis 37 of the probe in relation to the axis or centerline of the borehole which is shown superimposed on probe axis 37 in FIG. 1B. Section 64 of probe 10 shown in FIG. 1B includes a motor-pump unit making it possible to drive piston 58 by means of hydraulic connections which are not shown.

The dip of layers traversed by a borehole is determined by means of measurement electrodes fixed on four pads in the prior art and on at least two non-diametric pads in accordance with the present invention. The dip of an earth formation penetrated by a borehole can be determined in relation to a plane perpendicular to the axis of the borehole probe and common to the measurement electrodes. The inclination and orientation of this plane are variable since the probe is not always perfectly lined up with the axis of the borehole and since the axis of the borehole itself is not perfectly vertical and can change direction with depth. It is thus desirable to determine the borehole and the probe axis position at a given borehole depth in relation to a fixed surface reference.

For this purpose, section 66 of the probe shown in FIG. 1B includes a compass kept in horizontal plane which indicates the azimuth of one of the pad diameters, taken as a reference, e.g., the compass measures in a horizontal plane the angle between magnetic North and a radius from the probe axis to the center of a referenced pad. Section 66 also has a pendulum making it possible to locate the position of the referenced pad in relation to vertical, and a pendulum indicating the inclination of longitudinal axis 37 of the dipmeter probe with respect to vertical. These are well known instruments in conventional dipmeters and will not be described in further detail.

Section 68 includes downhole electronic equipment allowing a supply of source current utilized by the measurement electrodes, as well as a telemetry circuit for sending measurement signals to surface equipment 16 via cable 14. Section 68 is shown in detail in FIG. 3.

The operating principle of the dipmeter is illustrated schematically in the left hand part of FIG. 1B. A source signal generator not shown in FIG. 1B, located in section 68 sends the source current between metal housing section 38 of the dipmeter body and metallic casing 69 of section 68. These sections are then maintained at different signal potentials. In other words, the source generator has its terminals connected between section 38 and casing 69 of section 68. Section 38 and linkage members 48, 50 and 62 are all electrically connected, while sections 38 and 68 are insulated from each other by means of an insulating coating 70 which covers sections 64 and 66, previously described, and an insulating part 72 placed between these sections. Thus, source current cannot flow along the probe body member between sections 68 and 38, but is forced to flow outward from section 68 through the formation.

As shown schematically in the left hand side of FIG. 1B, for the case of a low frequency electric current as a source signal, the current lines indicated by references 74 and 82 join these two sections by passing through the formation. These current lines correspond to focussing or guard currents for the portion of the current flowing from measurement electrode 46 as illustrated by current line 84, which therefore penetrates into the formation perpendicular to the wall of the borehole facing pad 42. The value of measure current 84 is measured independently for each electrode or electrodes, as in the case of the present invention, on each pad. This measurement current is characteristic of electrical resistivity of the part of the earth formation located immediately adjacent to the measure electrode.

By way of example, a sand layer 88 has been represented in FIG. 1B between two clay layers 86 and 90. At boundaries 92 and 94 of sand layer 88, each measure electrode will indicate a variation in resistivity as the path for the electrode along the borehole wall traverses the boundary. The relative position of this variation in resistivity, as investigated by each electrode, makes it possible when sufficiently separated around the borehole, to determine the dip of sand layer 88. The resistivity variation produced by each measurement electrode will be separately recorded versus depth and will appear at different depths depending upon the position of the electrodes on a given pad and the position of each pad relative to the dip of the layer. This will result in an offsetting of the variations on each recorded signal as a function of depth. The measurement of this offset, corrected when appropriate for speed variations, indicates the dip of the layer.

In summary, FIG. 1A provides a simplified illustration of the general relationship required between signal source and measurement transducers, irrespective of the type of signal source or transducers utilized, while FIG. 1B provides a simplified illustration of an apparatus providing this relationship for an electrical investigation using electrode-type transducers mounted on pads adapted for application against the borehole wall. An electrical signal is maintained between a point centered in the borehole and remote from pads applied to the borehole wall. A source signal is focussed or guarded in the vicinity of the pads to assure equal signal distribution in the pad area and measurements taken at electrodes mounted on the pads will represent local variations in formation characteristics adjacent the electrodes. A further description of these pads and electrodes will now be provided.

Figure 2A:
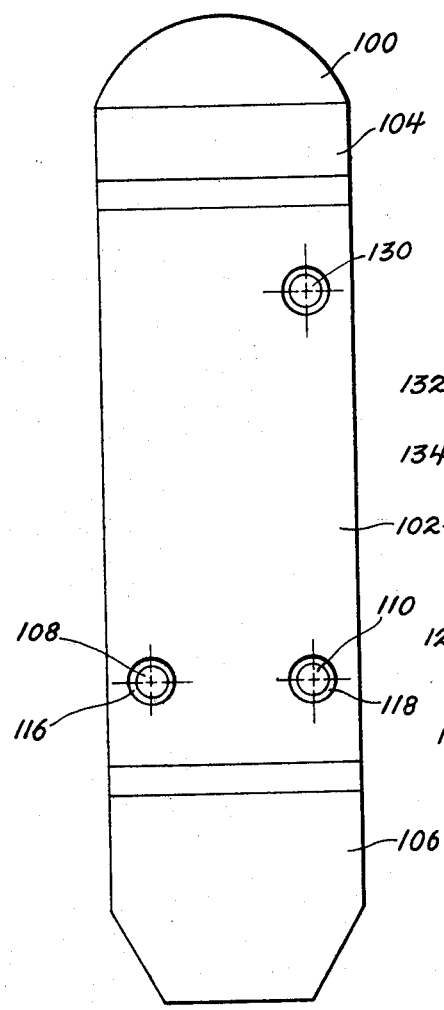
FIGS. 2A, 2B and 2C represent an embodiment of side-by-side transducer pads constructed in accordance with the invention which may be utilized on the apparatus shown in FIG. 1B.
Figure 2B:
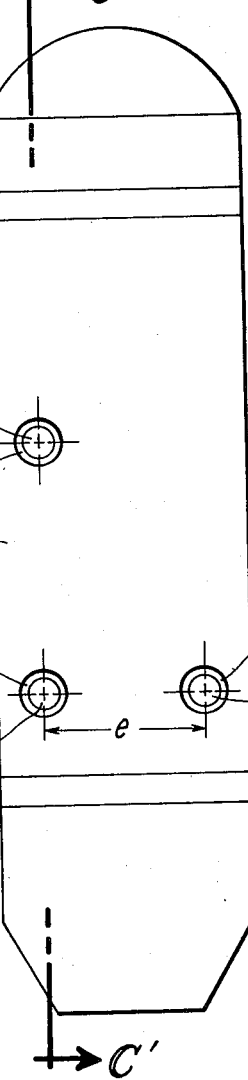
Figure 2C:
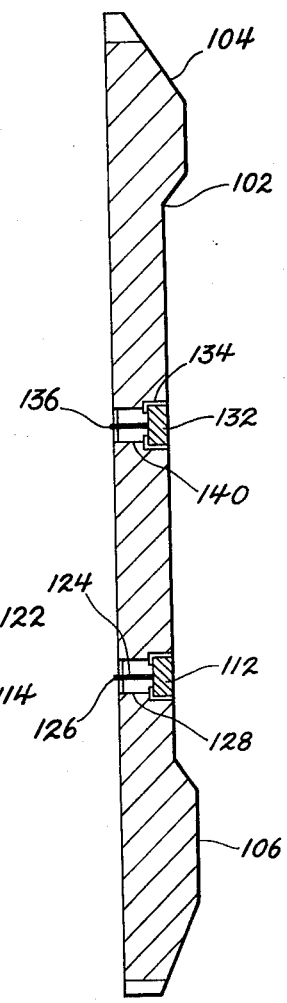

FIGS. 2A, 2B and 2C represent a preferential embodiment of the side-by-side transducers mounted on a pad in accordance with the invention for use on a dipmeter. FIG. 2A represents a front view of the pad in one form, and FIG. 2B represents a front view of another form. FIG. 2C represents the pad shown in FIG. 2B along section lines C'-C" in a plane perpendicular to the pad and going through one of the side-by-side transducers and a speed transducer located vertically above it.

The pads have a form elongated in the direction of movement, such as shown in FIGS. 2A, 2B and 2C. The rounded upper part 100 of each pad is the leading part in contact with the borehole wall as the dipmeter traverses the borehole towards the surface during production of the measurements. The pad can, but need not, have a hollow 102, as shown in FIG. 2C, flanked by two shoulders 104 and 106. The pad, by virtue of its conductive face, performs as a large focusing electrode. Therefore, the pad body may be made of conducting material which is a very good conductor of electricity, such as bronze.

As an example of dimensions applicable to borehole sizes commonly employed in the oil industry, hollow 102 has a thickness in the order of 0.2 cm, the pad width being in the order of 6 cm and its length about 25 cm. Each pad has two side-by-side measurement electrodes shown as 108 and 110 in FIG. 2A and 112 and 114 in FIG. 2B, respectively. The centerline to centerline separation between the side-by-side measurement electrodes measured is a distance of about 3 cm.

By the term, side-by-side, it is intended that the two measurement electrodes be mounted on the same pad with a fixed separation in the sidewise direction, e.g., the direction around the borehole circumference. The sidewise or circumferential separation is necessary in order to assure that the side-by-side electrodes do not repeat the measurements along the same path, or change the circumferential separation between the paths as may be expected when electrodes have substantial vertical displacement. However, the two side-by-side electrodes could be offset slightly in the vertical direction, but this vertical offset must be small compared to the sidewise offset. Further, it is preferred that the direction of any small vertical offset be consistent with the predicted direction and degree of rotation normally expected with withdrawal of the tool from the borehole.

The two side-by-side electrodes are preferably located in a plane perpendicular to the axis of the probe and hence in the same horizontal plane when the probe is vertical. This arrangement, although not imperative, is however advantageous. When two electrodes are offset vertically, as described in U.S. Pat. No. 3,521,154 previously discussed, the offset between the resulting signals may vary from the known vertical offset. As already mentioned, a varying offset may result when the speed of the probe in the borehole is not uniform as with yo-yo movement in particular. When resistivity signals produced from vertically offset electrodes are compared, it is necessary to allow for any variations in speed between the two measuring instants. The precision obtained is reduced owing to the fact that an error in varying degree is always committed on the determination of the probe's speed. The preferred arrangement of the invention whereby the two electrodes are side by side in a plane perpendicular to the probe axis and direction of movement considerably reduces this source of inaccuracy.

As shown in FIG. 2, measurement electrodes are electrically insulated from the conductive pad by electrically insulating supports 116, 118, 120 or 122, which are advantageously made of ceramic material. Each measurement electrode is connected by electrical connection 124 to an output terminal 126 located on the back face of the pad, and is embedded in an electrically insulating material 128 such as Araldite, for example. Electrodes are typically 0.5 cm in diameter.

As the speed of the dipmeter in the wellbore is not uniform, it is desirable to measure the speed at all times. For this purpose, different known means can be used. The most usual means employed in conventional dipmeters consists of an additional "speed" electrode, as previously discussed. This electrode may be identical in every respect, except for its position, to the above described measurement electrodes. As shown in FIG. 2, the speed electrode (130 or 132, respectively, in FIGS. 2A and 2B) is located vertically over and at a different known distances from one of the measure electrodes. The vertical displacement between the speed and measure electrodes will make it possible to record identical resistivity signals, since they are located one over the other in the direction of movement for the dipmeter and therefore will track the same paths along the borehole but at different moments which depend upon the speed of the dipmeter. Knowing the displacement between the speed and the measure signals as a function of time and the distance between the speed and measure electrodes, it is possible to deduce the instantaneous speed of the dipmeter at a given depth.

According to another feature of the invention, a second pad on the dipmeter probe shown in FIG. 1B also includes a speed electrode, but as shown in FIGS. 2A and 2B, the speed electrodes on the different pads are spaced at different known distances (at 12.5 and 5 cm, respectively, for FIGS. 2A and 2B). This feature makes it possible to obtain better accuracy on the dipmeter speed measurement. A relatively large spacing between the measure and speed electrodes, as shown in FIG. 2A, is favorable to measurement of relatively high speeds, whereas a relatively small spacing, as shown in FIG. 2B, is favorable to measurement of relatively low speeds.

In FIG. 2C it is shown that speed electrode 132 is constructed and mounted in substantially the same manner as previously described electrode 112, but is connected to output terminal 136.

Figure 3:
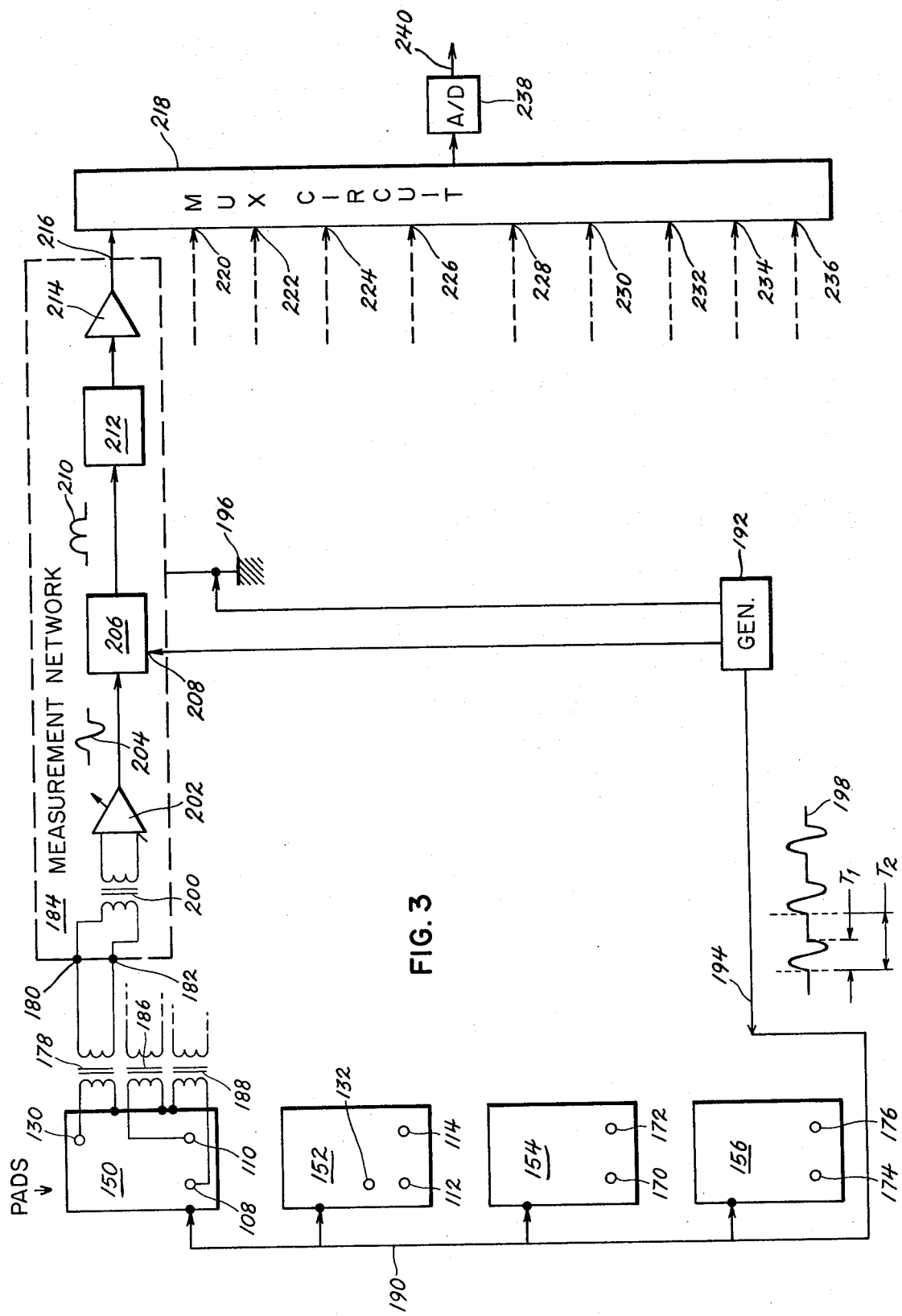
FIG. 3 represents in a simplified manner a circuit diagram for producing signals from a probe constructed in accordance with the invention.

FIG. 3 shows an embodiment of a measurement circuit for the dipmeter, the circuit being located in section 68 shown in FIG. 1B. The four pads of dipmeter 10 have been shown schematically as rectangles 150, 152, 154 and 156. As described in conjunction with FIGS. 2A and 2B, the first two pads 150 and 152 each have three electrodes, two side-by-side measurement electrodes, 108 and 110 or 112 and 114, and a speed electrode 130 or 132, respectively. The other two pads 154 and 156 each have two side-by-side measurement electrodes 170 and 172 or 174 and 176, respectively.

Each electrode is connected electrically to one of the two primary inputs of transformers 178, 186, 188, respectively, for three button pad 150, for example, and the other input being connected electrically to the pad itself. The conductive pad face provides focusing for the measure electrodes as already explained. Two secondary terminals of each input transformer 178 are connected at 180, 182 to two input terminals of measure network 184. Thus, each pair of side-by-side measurement electrodes, such as 108 and 110 is associated with a pair of input transformers, such as 186 and 188, respectively, as well as a measure network identical to the measure network 184 shown in FIG. 3. Similarly, for each speed electrode such as electrode 130, there is an input transformer 178 and a measure network 184, for example. All these have not been shown in FIG. 3 for sake of clarity. Input transformers 178, 186, 188 . . . etc., may be located on the back side of their associated pads and are designed to amplify the signals produced from the electrodes immediately before transmission to the probe body and additional electronics in order to decrease noise pickup, crosstalk, etc., and improve the signal-to-noise ratio.

The conductive faces of the pads are electrically connected to each other by connection 190 and to current generator 192 via connector 194, as shown in FIG. 3. Generator 192 supplies electric current to the pads which form focusing electrodes, and through primary circuits of transformers 178, 186 and 188 to the individual measure and speed electrodes. The second terminal of generator 192 is connected at 196 to a metallic casing 69 of section 68 shown in FIG. 1B which forms a ground. Generator 192 delivers pulses 198 as shown in FIG. 3 whose cycle $T_2$ is about 500 microseconds long. During the first part of the cycle, a sinusoidal signal having a cycle $T_1$ of about 250 microseconds is transmitted (frequencies of about 4 kHz). No other signal is transmitted during the last 250 microsecond part of the cycle.

Each network 184, as shown in FIG. 3 includes a transformer-amplifier 200 which also performs an isolation function. Its two primary terminals are connected to input terminals 180 and 182 of network 184. Its two secondary terminals are connected to inputs of variable-gain amplifier 202. The gain of this amplifier can be controlled, in a manner not illustrated in FIG. 3, by a control circuit located at the surface which acts to vary the gain when the output of network is, for example, momentarily saturated. This control circuit is coupled to a measurement recorder so as to change the measurement scale consistent with each change in gain.

The form of the signal output by variable-gain amplifier 202 is represented at 204 in FIG. 3. Signal 204 is then input into phase detector 206 which has its secondary input 208 connected to the signal generator 192, which has already been described. Phase detector 206 makes it possible to keep the only part of the measurement signal which is in phase with the current sent into the formation by generator 192. Output of phase detector 206 is a signal of the form shown at 210. This signal is input to low-pass filter 212 to integrate the signal. Low-pass filter 212 outputs a current whose value is characteristic of the amplitude of the detected measurement signal. This output current is amplified at 214 and then input at 216 to multiplexing circuit 218. This circuit includes as many inputs as there are measurement and speed electrodes, each with its identical measurement network 184. Multiplexing circuit 218, as illustrated, has ten inputs 216 and 220 through 236.

Multiplexing circuit 218 cyclically samples the ten measurement currents corresponding to four pairs of side-by-side signals and to two differently spaced speed signals continuously applied to its inputs and supplies them successively to input of analog-to-digital converter 238. The resulting digital output 240 is connected to a telemetry circuit (not shown) for sending the measurement signals in digital form to the surface. As previously mentioned, other standard signals such as the probe inclination and magnetic bearing, reference pad azimuth and caliper signals are also telemetered to surface equipment 16.

At the surface, the digital signals may be recorded directly on digital magnetic tape or transmitted to a well site or remote digital computer for recording and processing. Digital signals may also be converted to analog and recorded versus depth as curves as is the practice for conventional dipmeters. However, in accordance with one way of practicing the invention, signals from side-by-side transducer pads may also be recorded side-by-side in pairs (see left-hand side of FIG. 7), each pair replacing the single signal from one of the pads for the conventional dipmeter recording. This side-by-side recording is adapted for comparison of the likeness of the signals over short depth intervals so that differences between the signals indicating lateral characteristics may be readily determined. Since the physical distance between the side-by-side transducers is small and fixed and the measurement transducers and their environment maintained substantially identical for each side-by-side signal, this comparison is much easier than between the signals from the different pads recorded in the past where dip and diameter changes produced large pad-to-pad signal variations and large displacements between a signal obtained from one pad relative to another.

The present invention enables the determination of lateral characteristics of the formation. The formation characteristic may be an average characteristic, when investigating a section of a formation having a given thickness, or a point characteristic when one considers only one point or one section of the borehole. One of the characteristics which can be determined in accordance with the present invention is a function of lateral homogeneity of the formation (which might also be called the coefficient of lateral continuity or of lateral consistency or even perhaps, of laminar structuralization). This coefficient of lateral homogeneity of the formation corresponds to that part of the formation seen between the two measurement transducers located on the same pad. A local or an average value for the coefficient may be obtained.

Another lateral characteristic investigated in accordance with the present invention is the lateral inclination of the earth formation layers penetrated by the borehole as seen between the two measurement transducers located on the same pad. More precisely, the determination of this lateral inclination is carried out in a plane passing through the two measurement transducers mounted side-by-side on their common pad and parallel to the centerline of the borehole. This lateral inclination can be a local or point inclination or an average inclination depending upon how the side-by-side signals are compared and processed.

As previously mentioned, the invention pertains to determining the lateral characteristics of the formation. In the description that follows, there will be a description of the invention as it pertains to determining average and point lateral characteristics which require only a single pad and as it pertains to determining the dip of lateral characteristics which extend from pad to pad around the borehole.

The determination of average lateral characteristics furnishes an average value of the lateral inclination and of a function of lateral homogeneity of successive sections of the formation at regular intervals; for example, every meter. A correlation technique is performed between signals transmitted from two electrodes mounted side-by-side on one pad. By correlation, a depth displacement exhibiting the best likeness between the side-by-side signals is determined as an indication of the lateral characteristics of the formation passing between the two side-by-side electrodes. This correlation operation is repeated on consecutive fixed length sections of the signals.

FIG. 4 illustrates one means of performing the correlation operation. Two registers $R_1$ and $R_2$ respectively record the two signals coming from the side-by-side electrodes of a given pad. Each register has a fixed capacity in signal samples, as for example, as shown in FIG. 4, 600 samples which is equivalent to 1.5 meters of formation at typical sampling rates. By way of example, signals coming from the left-hand electrode are stored in register $R_1$ and those coming from the right-hand electrode on the same pad are stored in register $R_2$. Signals are recorded in their order of arrival, going from sample row 1 to row m of each particular register.

Signals stored from row p to row q (with $P<q$) of register $R_1$ comprise a correlation interval of N samples ($N=q-p+1$). A value $s=p-1$ is called the maximum search interval. A measurement sample stored in row d (with $d=q+s$) is called the trigger sample. This function will be explained later. By way of example, in FIG. 4, p=26, q=425, N=400, s=25 and d=450. The sampling rate or the value of N may be chosen so that the length of the correlation interval N corresponds to one meter of formation. A typical search interval s for this case corresponds to 6.25 cm. This interval corresponds to the maximum offset likely between measurements from 0.5 cm. diameter electrodes with side-by-side spacings of 3 cm.

The correlation operation is a well-known one. It consists of correlating a number of measurements from one set with a like number from another set to see how closely the measurement sets resemble one another. As applied herein, the correlation operation is repeated for a number of measurement sets with varying depth displacements between them. Each operation produces a likeness factor. After comparing a given number of sets depending upon the value of the search interval s, the best likeness factor is determined, and the depth displacement corresponding to the best likeness derived from the search offset at that point.

As shown in FIG. 4, the measurement sets consist of N values with one set located in register $R_1$ and the other in register $R_2$. The cross-hatched sample rows extending from p to q in register $R_1$ are involved in each correlation operation and are compared with a like number of samples from register $R_2$. The offset between the sample intervals changes with each correlation operation. For the first operation, the sample interval designated $I_1$ is employed, with $I_2$, $I_3$, $I_4$, etc., employed on successive operations as the sample interval shifts upward in register $R_2$. The number of operations depends upon the value of s and as illustrated in FIG. 4, involves 51 overlapping intervals from $R_2$. For each of these operations and intervals, a likeness factor C(t) is produced as t varies from $-s$ through 0 to $+s$.

Described mathematically and designating $A_i$ as the value contained in row i of register $R_1$, and $B_i$ as the value of row i of register $R_2$, $$C(t) = \frac{\sum_{i=p}^{q} (A_i - \bar{A})[B_{i+t} - \bar{B}(t)]}{T_A \cdot T_B(t)}$$

in which $$\bar{A} = \frac{1}{N} \sum_{i=p}^{q} A_i,$$

$$\bar{B}(t) = \frac{1}{N} \sum_{j=p+t}^{q+t} B_j,$$

$$T_A = \left[ \frac{1}{N} \neq \sum_{i=p}^{q} (A_i^2 - \bar{A}^2) \right]^{\frac{1}{2}}, \text{ and}$$

$$T_B(t) = \left[ \frac{1}{N} \sum_{j=p+t}^{q+t} B_j^2 - \bar{B}(t)^2 \right]^{\frac{1}{2}}.$$

C(t) corresponds to a likeness factor between N samples of the interval between $A_p$ and $A_q$ and a like length interval also of N samples between $B_{p+t}$ and $B_{q+t}$.

The above correlation operation provides a likeness factor C(t) for each depth displacement or offset t. Successive correlation operations with depth offsets from $-s$ to $+s$ provide a series of factors forming a correlogram describing the similarity or likeness between the signals as a function of the depth displacements. This correlogram is then searched to find the best likeness factor and corresponding depth displacement.

The value of C(t) for a perfect likeness will vary with the type of correlation function employed and if the function provides for normalization of values. It is preferred that a normalized type of correlation function be employed. Normalized types providing either values of zero, plus one or minus one for a perfect likeness may also be employed. To generalize, the term "best likeness" will be used herein to describe the value of the C(t) factor corresponding to the best correlation or likeness. It should be understood that the value of the C(t) factor corresponding to the best likeness i.e. the best likeness factor, reflects the degree of similarity between the two signal intervals at the corresponding depth displacement t.

The above correlation process provides the correct lateral homogeneity or likeness factor, even if the homogeneous layers are inclined. The particular features on the signals from the side-by-side transducers may be offset to some degree with one another and the best likeness factor will still be provided, since the value of C(t) is not limited to the value when the two signals were not offset with each other. It is in this manner that a laterally homogeneous layer which dips relative to the borehole and provides identical but offset signals from side-by-side transducers will produce substantially the same best likeness factor for different pads, even though the different pairs of side-by-side signals will be offset from one another by varying degrees depending upon the position of the pads relative to the plane of the dipping formation layer. When the signal features correspond to bedding planes, the depth displacements corresponding to these best likeness factors will vary from pad to pad and this displacement variation may be used to determine the dip of the bedding plane.

Returning again to FIG. 4, it will be recalled that the measurement signals are stored in the registers from row 1 upward toward row m. It will be apparent that the correlation operation may begin as soon as samples corresponding to row q is stored and proceed with varying displacements, beginning at $t=-s$ through $t=0$ without further samples. However, to continue the series of correlation operations, samples from rows above q in register $R_2$ will be required and the correlation operation can not be completed until sample $d=q+s$ has been stored in register $R_2$. However, once sample d has been stored, the correlation operation sequence may be triggered without requiring the monitoring of further sample recording, provided that the correlation operation is completed before samples beyond the register capacity m must be recorded.

It will be apparent that once the correlation operation is complete, the samples to be retained for the next correlation may be shifted downward in the registers by the number of samples corresponding to the step between correlated intervals. For example, if non-overlapping intervals are employed, the step between correlations is equal to the correlation interval N. In this case, the samples stored at row $q-s+1$ may be downwardly shifted to row 1 and storage of incoming new samples continuing with the row following the position of the now shifted, most recent sample. The correlation process may be triggered again once sample d has been recorded.

From the above, it will be apparent that the correlation operations may be carried out advantageously in real time and that the capacity m of registers $R_1$ and $R_2$ need not be prohibitively large.

FIG. 5 shows schematically apparatus used for automatically comparing the side-by-side signals by correlation and hence for determining lateral characteristics of the formation passing between the side-by-side transducers. These characteristics are, in this case, the average lateral inclination and average lateral homogeneity, as seen by two side-by-side electrodes on the same pad. When the probe has several pads with side-by-side electrodes, apparatus such as shown in FIG. 5 can be assigned to each such pad and there may be as many devices, such as shown in FIG. 5, as there are such pads. To the extent that, working in real time, the calculation speed of one device is much higher than the acquisition speed for the measurements from each pad, a device may be shared by more than one pad.

As shown in FIG. 5, the two side-by-side measurement electrodes of the assigned pad have been illustrated schematically by blocks 300 and 302 and the corresponding measurements as routed by control circuit 306 respectively to registers $R_1$ and $R_2$. During a first phase, clock 304 triggers control circuit 306 enabling storage of digital signal samples coming from measurement transducer electrodes 300 and 302 into registers $R_1$ and $R_2$ means of positioning circuits respectively shown at 308 and 310. Each positioning circuit acts such that the measurement signal samples are stored in registers $R_1$ and $R_2$, respectively, in accordance with their order or arrival, beginning at memory row 1.

When positioning circuits 308 and 310 reach row $d=q+s$ (see FIG. 4) and a sample regarded as the trigger sample, logic circuit 314 actuates trigger circuit 322 which initiates correlator 324. The correlation operation is then begun and can be carried out independent of the sampling rate, the correlation operation being completed during the acquisition time of a few samples. Meanwhile, logic circuit 314 continues to control positioning circuits 308 and 310 so that the measurement samples which follow are stored one after the other from row d+1 (see FIG. 4) up to the last row m of the respective registers.

By the time the registers are completely full; i.e., when the positioning circuits reach row m, the correlation operation is complete. Logic circuit 314 then actuates offset control circuit 316 which itself actuates respective shifters 318 and 320 of the associated registers $R_1$ and $R_2$. The resulting shifting operation consists of copying into rows 1 through k (see FIG. 4) the contents of rows (q−s+1) to m of respective registers $R_1$ and $R_2$. Thereafter, logic circuit 314 resets positioning circuits 308 and 310 to row k+1 for the recording of the next signal sample. Conventional electronics allows performing this shifting operation sufficiently fast so that the storage of measurement samples coming from the side-by-side transducers is not interrupted. Subsequent storage and advancing of the row positioning circuits continues until row d is again reached as described above and correlator 324 is triggered into another operation.

Correlator 324 calculates for each operation the average lateral inclination t and an a function of average lateral homogeneity C(t), which are functions of the best likeness factor and corresponding displacement already described. These results are stored in output circuit 326 and subsequently recorded on magnetic media as shown in FIG. 5 at 328. Continuous comparisons of the side-by-side signals over successive intervals of N samples and recording of the resulting lateral characteristics takes place as the probe traverses the borehole until samples cease to arrive from the downhole side-by-side electrodes.

The correlation operation performed by correlator 324 as shown in FIG. 5 and described above is of the classical type. Other embodiments corresponding to different correlations are possible and may also be suitable. For example, it is possible to use a correlation technique employing pattern recognition which enables the determination of point characteristics.

According to another embodiment of the present invention, measurements produced from side-by-side electrodes on a given pad may be employed to determine the local degree of lateral homogeneity and lateral inclination between two points characteristic of a thin layer of formation. The preferred technique used for determining the lateral characteristics between signal points employs a pattern recognition correlation method. This technique has been described in U.S. application Ser. No. 362,160 filed May 21, 1973 by P. Vincent.

According to this pattern recognition technique, signals representing variations with depth are broken down into detected types of elements (bumps, hollows, peaks, etc.) and a network of specific parameters calculated for each element. Thus, for each signal there are arrays of detected characteristic types of elements and their associated descriptive parameters. The correlation operation comprises searching for possible corresponding elements, beginning with the types of detected elements known to have the highest likelihood to extend laterally around the borehole and therefore appearing on more than one signal and then progressing to the less likely types of elements but now constrained in the search for possible correspondence by the established correspondence for the more likely types of elements. To determine the corresponding element for a given element of one signal, elements on another signal which are a type considered to possibly correspond are selected and compared. Possibly corresponding elements must lie within depth boundaries already established by elements found to correspond. The real correspondent is determined from the possibly corresponding elements by deriving a correlation factor C for each possibly corresponding element in accordance with a formula of the following type:

$$C=(P_1-P_1')^2+(P_2-P_2')^2+ \ldots (P_m-P_m')^2;$$

where $P_1, P_2 \ldots P_m$ and $P_1', P_2' \ldots P_m'$ are the respective values for the different characterizing parameters for the considered element and its possible correspondents on the two signals. Note that the correlation factor C is always positive. The more the two considered elements are alike, as represented by smaller and smaller differences between P and P' for their individual parameters, the closer the likeness factor C will be to zero. Different values of C will be obtained from each considered possibly corresponding element and these values then compared with each other. In this case, the factor having the value closest to zero corresponds to the best likeness factor. However, the two lowest C factors are compared against a discernability threshhold $s_1$ to prevent ambiguity because they are too close to each other to allow a unique corresponding element to be designated. If the two best likeness factors do not differ by $s_1$, no corresponding element is designated, since such a designation will place limitations on the selection of other possible corresponding elements.

If, on the other hand, the difference between the best and the next best likeness factors is greater than $s_1$ such that there is no ambiguity, the best likeness factor may then be compared to a second threshold $s_2$ called a likelihood threshold. If the best likeness factor is higher than $s_2$, an uncertainty is considered to exist regarding the identity of a unique correspondent element and here, too, no designation is made.

When the best likeness factor passes these tests, the best likeness element is accepted as the corresponding element. A common characteristic point (such as its peak, inflection point, etc. for examples) on the two corresponding elements, one from each side-by-side signal, are now regarded as lying on the same lateral characteristic of the formation. The depth displacement between these points provides the point-to-point lateral inclination characteristic and the best likeness factor provides the degree of lateral homogeneity.

Summarizing then, in the point-by-point technique, in order for one of the possible corresponding elements to be actually accepted as the correspondent of the given element, its correlation factor should not only be sufficiently different from the factor of other possible correspondents, but should also indicate a sufficient degree of likeness between the two elements.

Apparatus shown schematically in FIG. 6 may be used to implement the above described pattern recognition technique. Signals from the two side-by-side transducers of a given pad, shown here as blocks 300 and 302, are input to a pattern detector 332 which selects characteristic patterns (bumps, hollows, peaks, etc.) from each signal representing specific types of elements in accordance with variations in amplitude of each measurement signal with depth. These different patterns are then correlated by means of a pattern correlator 334 to determine the elements of the two signals which correspond to each other. The results of this correlation are then provided to output circuit 336 which can be, for example, a recorder. The results then can be recorded as shown on magnetic tape 338, for example, as shown in FIG. 6.

Information delivered by pattern correlator 334 as shown in FIG. 6 comprises a succession of elementary patterns, each defined firstly, by two sample numbers $g_1$ and $g_2$, where $g_1$ is less then $g_2$ relating to signals sampled from one side-by-side electrode, these numbers representing common points for each corresponding elementary pattern, along with its best likeness factor C. Four sample numbers, $g_1$, $g_2$, $h_1$ and $h_2$ indicate that correlator 334 was able to identify on the two side-by-side signals the same characteristic extending between samples $g_1$ and $g_2$ on the first of the two side-by-side signals and samples $h_1$ and $h_2$ on the second. This is illustrated graphically in FIG. 7 in which the two signals are represented as $I_1$ and $I_2$, corresponding to the two measurements conducted by two electrodes on pad I. Also shown in FIG. 7 is an additional signal $II_1$ representing a measurement recorded by an electrode on a different pad (here, pad II).

Referring to FIG. 7 and by applying the pattern recognition correlation technique just described, consider peaks 340 and 342, hollows 344 and 346 and a series of apexes A1, B1, A2, B2, A3, B3, etc., respectively detected on signals $I_1$ and $I_2$. Further consider that pattern correlator 334 has designated that, due to the uniqueness of the elements, peaks 340 and 342 correspond and that hollows 344 and 346 also correspond. However, the apexes are not so unique and that the current operation of pattern correlator 334 is to find the corresponding element for apex A2 or signal $I_1$ among four other apexes, $B_1$, $B_2$, $B_3$ and $B_4$ located on signal $I_2$.

Because the lateral distance between the side-by-side electrodes which produced signals $I_1$ and $I_2$ is small compared to the vertical distances separating successive apexes on each side-by-side signal, it is possible to limit the vertical distance within which possible corresponding elements may be found. For example, if the maximum lateral inclination corresponds to the angle a as shown in FIG. 7, then possibly corresponding elements to element A2 on signal $I_1$ must occur within a given number of samples on signal $I_2$ described by the angles $+a$ and $-a$ applied relative to the position of element A2. In samples, this corresponds to a sample interval $+s$ and $-s$, respectively above and below a characterizing point on element A2.

As shown in FIG. 7, this vertical distance limitation implied by the relatively small lateral distance between the side-by-side paths, eliminates the two extreme apexes B1 and B4 from consideration as possibly corresponding elements, leaving apex elements B2 and B3. Subsequent computations of the likeness factor C finds that element B2 is the best likeness and sufficiently discernible from element B3 to be designated as the corresponding element. Once so designated, the characterizing points on elements A2 and B2 may be considered as the same formation characteristic inclined laterally at an angle shown in FIG. 7 as c.

Since the distance between the side-by-side transducers is fixed and known, the inclination of the line connecting the same characterizing point on two elements found to be corresponding may be determined. The line between corresponding points can be expressed as a displacement or shift t, like that found for the best likeness factor C(t) for the conventional type correlation, and like this displacement, it may be readily converted into a lateral inclination angle c in the plane of the electrodes.

As further shown in FIG. 7, the angle c is formed by a lateral inclination line, joining common points on the now known to correspond apexes A2 and B2, relative to a line E-E' joining the centers of the two side-by-side electrodes on pad I. Note that line E-E' forms a plane common to electrodes on other pads as well. By projecting the lateral inclinational line at angle c around the borehole to the path corresponding to signal $II_1$ as shown in FIG. 7 and allowing for an angle b of uncertainty centered on angle c, a small interval $S_{II}$ is determined and limits the signal II interval where possibly corresponding elements to apexes A2 and B2 may be expected. This small $S_{II}$ search interval is in contrast to a very much larger interval $S_{II}'$ which, without the direction provided by lateral inclination angle c, must be equally divided above and below line E-E' as was the interval $+s$ and $-s$ describing $S_I$, before the establishment of corresponding elements A2 and B2 limited the range of search. As illustrated in FIG. 7, this considerably reduces the number of possibly corresponding elements on signal II. For example, as shown in FIG. 7, at least nine apexes can be detected in interval $S_{II}'$, varying from $C_1$ to $C_9$. Only a single apex element $C_3$ is found in interval $S_{II}$, which considerably increases the certainty of the correlation and the fineness of the detail that may be expected.

Thus, projecting the lateral inclination found between two side-by-side signals from one pad provides a considerable advantage in correlating the signals from one pad to another. Each pair of side-by-side signals provides such lateral inclination information defined by the plane going through two side-by-side electrodes and parallel to the longitudinal axis of the borehole. Diamenter information is not needed to determine this lateral inclination. To extend the lateral inclination angle to signals on other pads, the diameter information is needed and is reflected in the displacement between the signals shown in FIG. 7. While this projection of a lateral inclination angle is shown for only one pair of corresponding elements on signals from pad I, it should be understood that this projection may be made for each pair of corresponding elements and associated lateral inclinations. This projection may also be made toward signals from pads lying on either side of the pad containing the side-by-side transducers from which the signals were derived. When the logging probe includes four pads, each containing the side-by-side transducer embodiment of the invention and the comparison is made therebetween, such lateral inclination determinations and projections are possible for each pad to the two pads lying on either side of that pad.

In addition to the point inclination and homogeneity determined as described above, the invention also makes it possible to select intervals on the recorded signals between patterns which are determined as corresponding from one electrode signal to another and apply standard correlation processes for these intervals. This possibility is of importance, for example, for precise and reliable calculation of the dip of layers as explained further below, because noncorrelatable intervals will not be attempted and, consequently, will not give rise to erroneous dip values.

The pattern recognition technique applied to side-by-side signals also makes it possible to determine the local lateral homogeneity of the formation traversed by the borehole, which now may be characterized as the percentage of patterns recognized as corresponding from one electrode to the other. Lateral homogeneity is useful for determining the depositional nature of the formation; it makes it possible, for example, to determine whether the considered layer is a conglomerate (chaotic accumulation) or whether stratification is more or less well characterized. This is possible only because two electrodes are fixed on the same pads sufficiently near each other. Signals recorded by means of the same pad can be very similar for a given formation because imperfections stemming from the common measurement pad affect the two measurements practically the same way. For example, if the pad does not bear properly on the borehole wall, this phenomena will be reflected in the same manner on both measurements. Consequently, any dissimilarity between the two signals results primarily from a difference in the local nature of the formation. Moreover, the smaller the lateral distance between the two side-by-side electrodes, the finer will be the determination of the lateral nature of the formation. Thus, it is possible to detect inclined fractures in formations traversed by the borehole.

As an example, in accordance with the invention, lateral characteristics of the formation determined as described above can constitute a first phase in the determination of the dip of laterally extending layers traversed by the borehole.

The determination of dip requires, using prior art techniques, at least three measurements, each made with a different pad. It should be noted that three measurements may be from one of the two side-by-side electrodes from a pad constructed in accordance with the invention and perhaps already used in the determination of the lateral inclination and homogeneity. In accordance with the invention, two lateral inclinations obtained between different pairs of side-by-side signals from two non-diametrically opposite pads is sufficient for determining the average dip plane. This average plane is parallel to the two lateral inclinations determined for a considered formation interval. Thus, it is noted that a dip-meter constructed in conformity with the invention may have only two non-diametrically opposite pads.

If the dipmeter used has four pads constructed in accordance with the invention, four lateral inclinations may be determined, one for each such pad, for a considered interval of formation. Lateral inclinations relative to diametrically opposed pads are in principle parallel to one another within measurement accuracy possibilities. It is possible to determine the accuracy by comparing these inclinations, knowing that they should be parallel. An average lateral inclination may be obtained by algebraically combining lateral inclinations obtained between pairs of diametrically opposed pads. With four such pads, two average inclinations corresponding to the perpendicular diameters may be obtained. The plane parallel to these two average lateral inclinations may then be determined and taken as the average dip plane.

When it is not possible to determine an average lateral inclination, as for example, because the two signals obtained between the side-by-side electrodes on one of the diametrically opposed pads are too dissimilar, or because of the defect in the measurement device, or for any other known reason, it is possible to assign to this pad the lateral inclination determined from the pad opposite it. Thus, four lateral inclinations and the average dip plane can be determined as indicated in the preceding paragraph.

As the side-by-side electrodes on a given pad are relatively close to each other, the accuracy obtained on a single lateral inclination is not very high. In practice, it is about 10°. However, as described below, even this somewhat inaccurate inclination may be employed advantageously.

Classical dip determination correlates four signals, two at a time, around the borehole. As already stated, only three signals are required but a fourth signal enables testing and better results. In accordance with the invention, by incorporating the above-described lateral inclination, the classic dip determination may be further improved.

To correlate signals two-by-two from pad-to-pad, it is possible to limit the maximum search range employed for the two-by-two correlation operation using the average lateral inclination, even though its accuracy is on the order of 10° or, preferably, using the average dip plane. As a result of limiting the search range, the dip measurement accuracy is improved by eliminating intervals of pad-to-pad correlations which are incompatible with the lateral inclination or average dip planes obtained by comparing the side-by-side signals from a given pad. Moreover, the possibility of restricting the search range in the correlation operation guides the search for pad-to-pad correlations around the borehole at approximately the true dip angle or offset and thereby limits the risks present because the distance between the pads is greater than the distance between the side-by-side electrodes of the same pad. As already described in conjunction with FIG. 7, the lateral inclination determined can be represented by an angle c or a line in space passing through to correlated point (A2 and B2, as shown in FIG. 7). This lateral inclination angle or line may be projected from one pad to a signal obtained from an electrode on a different pad. In FIG. 7, the lateral inclination angle determined from the side-by-side signals obtained from pad I were projected to a signal obtained from an electrode on pad II. The description that follows will provide further details.

In FIG. 8, the borehole has been represented very schematically by cylinder 350. Four pads, I, II, III, and IV each move in contact with this cylinder, the pads being arranged 90° from each other. Two electrodes on each pad trace parallel paths such as shown in FIG. 8 as 352 and 354 for pad I and 356 and 358 for pad II. If it is assumed that a lateral inclination between the signals from pad I has been determined between points A and B for pad I and between points $C_1$ and $D_1$, $C_2$ and $D_2$, $C_3$, and $D_3$, respectively, for side-by-side signals from pad II, dip determination is facilitated by looking for the pair of points (C,D) from pad II signals which are in the same plane as points A and B. For example, if four points A, B, $C_2$ and $D_2$ are determined to be in the same plane, this provides assurance that this plane is the average dip plane.

The above operations may be determined for other pairs of signals, as for example, between those from pad II and pad III, or between pads III and IV, and even continuing around the borehole, from pads IV to I. Knowing, as previously described, that lateral inclinations from diametrically opposing pads such as I and III, or II and IV, should be parallel if they correspond to the same average dip plane, two points determined, as for example, points A and B on pad I, may be used to guide the correlation for the diametrically opposite pad III. In this manner, the determination of dip from lateral inclinations determined between two side-by-side signals provides coherence for correlations performed from pad to pad and makes it possible to eliminate many risks of error resulting from similar features or similar signal intervals lying outside the interval indicated by the lateral inclination angle.

It may also be of interest to use a dip determination method employing statistics. Such a method is described, for example, in U.S. patent application Ser. No. 544,421 filed Jan. 27, 1975 by Philippe Vincent. This method permits the determination of the dip value of a formation for a given depth interval. According to this method, displacements between points on two signals are converted into sets of possible dip values. These sets of values are defined as varying width lines in a referenced plane, generally perpendicular to the longitudinal axis of the borehole. Thus, a possible set of dip values may be represented between points A and B as shown in FIG. 8, or between points B and $C_2$. Using this procedure for all pairs of correlated points between side-by-side signals or between signals from different pads over a given depth interval, one obtains a series of lines in the referenced plane. If the displacement between the point pairs correspond to a single dip value, all of the lines will coincide at one place in the reference plane. However, it is known that such displacements have inaccuracies which are reflected in the width of the lines. Even so, when the operation is repeated between numerous pairs of signals for the same depth interval, the common intersection area between series of lines in the referenced plane becomes defined as a common spot or zone in the reference plane, and provides the average dip value for the depth interval.

Still another advantage of the present invention utilized in any correlation method will become apparent when it is realized that by replacing the four pads of the prior art dip-meter with four side-by-side transducer pads in accordance with the invention, twice the number of signals are provided, all from transducers located on the same plane. This alone considerably enhances existing correlation methods and is explained below. The doubling of the number of signals considerably more than doubles the number of displacements or dips determinable by correlation, first, because the more closely spaced the transducers are around the borehole, the more correlatable will be the signals producing more and better quality displacements, and second, because the number of correlatable signal combinations increases almost ten-fold.

For example, in the prior art four-pad dipmeter and its four signals, there are thirteen possible signal combinations capable of determining dip: four with adjacent signals such as (I-II), (II-III); eight combinations of adjacent and diagonal signals (I-II), (II-IV) and one combination of diagonal signals (I-III), (II-IV). With the eight signals from a four side-by-side transducer pad dipmeter, there are 56 triangular combinations using two side-by-side signals from a given pad and one of these signals with another signal from another pad, such as $(I_1-I_2)$, $(I_1-II_1)$, and 64 quadrangular shaped combinations, eight using non-adjacent sides, such as $(I_1-II_2)$, $(II_1-II_2)$; 32 side and first diagonal combinations, such as $(I_1-I_2)$, $(II_1-III_1)$ and 24 adjacent second diagonal combinations, such as $(I_1-I_2)$, $(II_1-III_2)$; for a total of 120 useable combinations. Thus, the invention provides nearly ten times the number of displacement combinations present in the prior art and readily lends itself to statistical techniques such as the above described statistical method.

It is of course understood that the present invention is not limited expressly to the arrangements described and that the scope of the present invention also extends to other variations, in all or in part of such arrangements and to other applications thereof. For example, where the measurement electrodes were described and the physical characteristic measured was electrical resistivity, other types of electrodes or transducers may be employed, measuring other characteristics of the formation. The term "electrode" thus encompasses transducer devices allowing measurement of physical characteristics such as acoustic, microwave electromagnetic and magnetic transducers, for example.

There has been described method and apparatus for investigating lateral characteristics of an earth formation penetrated by a borehole. Substantially identical transducers are mounted side-by-side of each other at a fixed separation on the same pad. As this side-by-side transducer pad is moved along the borehole wall, the transducers provide side-by-side investigation paths along the borehole wall at a fixed separation which is less than the radius of the borehole. Each transducer conducts a generally identical investigation representative of the formation characteristics immediately adjacent the transducer as it moves along one of the side-by-side paths. In this manner, measurement signals produced from the side-by-side transducers differ only when the formation characteristics change between the transducers. By recording the side-by-side signals in a manner adapted for comparing their likeness, it is possible to determine lateral characteristics of the formation between the side-by-side paths.

Recording of the side-by-side signals may be optical and display the signals alongside each other such as shown in FIG. 7 or superimposed one upon the other as is known in the prior art to allow visual comparison of the signals and differences therebetween. A high degree of similarity between the side-by-side signals indicates the measured formation characteristic is laterally homogeneous. Signals very much alike but displaced one relative to the other indicates the laterally homogeneous characteristic is also laterally inclined in a plane including the side-by-side transducers and extending vertically along the borehole wall and thus parallel to the borehole centerline.

When two or more side-by-side transducer pads are employed and compared in the above manner, differences in the lateral homogeneity and lateral inclination for each of the pads indicates the laterally homogeneous characteristic of the formation may be employed to determine the dip of the formation. By knowing the orientation of the planes in which the lateral inclination for each of the pads correspond, the dip of a laterally homogeneous formation characteristic may be determined.

Even when only one side-by-side transducer pad is employed to replace one of the pads of a prior art dipmeter, the lateral homogeneity and lateral inclination derived from the side-by-side signals produced from this pad may be advantageously employed to improve the dip determination. Where lateral homogeneity is high for a particular formation characteristic, this information may be used to guide the correlation of this characteristic from pad to pad around the borehole. The lateral inclination can be projected from the position of the side-by-side transducer pad to the position of other pads and used to predict the interval on signals obtained from these pads which may be expected to reflect the same laterally extending characteristic. The ability to predict an appropriate interval on signals from other pads considerably reduces the correlation search range and the associated degree of risk for a miscorrelation on other look-alike patterns present in the larger search ranges normally employed without the benefit of the much smaller predicted search range. When comparison of the side-by-side transducer signals finds poor lateral homogeneity, signals from this pad may advantageously be disqualified from dip determination, reducing the risk that their use would otherwise bring to the correlation process.

When all the pads of a dipmeter are of the side-by-side transducer arrangement, twice the number of correlatable signals are provided. This more than doubles the number of correlatable signal combinations which may be used to provide displacements and dips. For example, when four pads constructed in accordance with the invention are employed, the increase from four to eight signals produced provides almost a ten-fold increase.

The above-described embodiments are intended to be exemplary and variations therefrom may be contemplated without departing from the scope and spirit of the invention.

What is claimed is:

1. A method of investigating characteristics of an earth formation penetrated by a borehole, employing substantially identical transducers traversing different paths on the borehole wall, comprising:
   a. producing a first signal from a first measurement transducer mounted on a pad adapted for application against the borehole wall;
   b. contemporaneously producing a second signal from a second measurement transducer substantially identical to said first transducer and mounted on said pad alongside said first transducer at a fixed distance therefrom in a plane normal to the direction of movement along the borehole, said transducers mounted on said pad following side-by-side paths spaced from one another by a fixed separation which is less than the radius of the borehole as said pad and transducers are moved along said borehole, each of said measurement transducers providing a generally identical investigation representative of formation characteristics immediately adjacent the respective transducer over at least a continuous portion of said borehole and along said side-by-side paths, said signals differing when said characteristics adjacent each of said transducers differ;
   recording said first and second signals in a manner adapted for comparing their likeness at a given depth to determine lateral characteristics in said formation between said side-by-side paths;
   automatically comparing said first and second signals to provide an indication of lateral differences between said signals for various displacements therebetween, said displacements corresponding to different depths along the borehole, to determine the depth displacement corresponding to the best likeness and in response thereto recording an indication of lateral characteristics which is a function of said best likeness and determined displacement.

2. The method of claim 1 wherein the step of automatically comparing said first and second signals comprises correlating a small interval of said first signal with a number of intervals of various depth displacements of said second signal to provide a likeness factor for each compared interval and comparing the provided likeness factors to determine the best likeness factor and its corresponding displacement wherein said best likeness factor represents the lateral homogeneity characteristic of said formation between said side-by-side paths and said determined displacement represents the lateral inclination of said characteristic relative to said plane normal to the direction of movement along the borehole.

3. The method of claim 1 further comprising:
   automatically detecting patterns on said first and second signals and correlating a pattern on said first signal with possible corresponding patterns on said second signal at various displacements corresponding to different depths along the borehole, said correlation producing likeness factors for each of said possible corresponding patterns,
   selecting as corresponding the pattern having the best likeness, and
   recording an indication which is a function of said best likeness as representative of the lateral homogeneity and which is a function of the corresponding displacement as representative of the lateral inclination of the measured characteristic of said formation between said paths.

4. A method of investigating characteristics of an earth formation penetrated by a borehole, employing substantially identical transducers traversing different paths on the borehole wall, comprising:
   a. producing a first signal from a first measurement transducer mounted on a pad adapted for application against the borehole wall;
   b. contemporaneously producing a second signal from a second measurement transducer substantially identical to said first transducer and mounted on said pad alongside said first transducer at a fixed distance therefrom in a plane normal to the direction of movement along the borehole, said first and second signals corresponding to generally identical, substantially vertical investigations of formation characteristics along at least a continuous portion of said borehole immediately adjacent the respective transducers and along side-by-side paths at a fixed separation which is less than the radius of the borehole as said pad is moved along said borehole; and c. automatically comparing said first and second signals to provide an indication of lateral differences between said signals for various depth displacements therebetween, said displacements corresponding to different depths along the borehole, to determine the depth displacement corresponding to the best likeness and in response thereto recording an indication of lateral characteristics of said earth formation between said paths, said indication comprising a function of said best likeness and determined displacement.

5. The method of claim 4 wherein the step of automatically comparing said first and second signals comprises correlating a small interval of said first signal with a number of intervals of various depth displacements of said second signal to provide a likeness factor for each compared interval and comparing the provided likeness factors to determine the best likeness factor and its corresponding displacement wherein said best likeness factor represents a lateral homogeneity characteristic of said formation between said side-by-side paths and said determined displacement represents a lateral inclination of said characteristic relative to said plane normal to the direction of movement along the borehole.

6. The method of claim 4 wherein the step of automatically comparing further comprises:
automatically detecting patterns on said first and second signals and correlating a pattern on said first signal with possibly corresponding patterns on said second signal at various displacements corresponding to different depths along the borehole, said correlation producing likeness factors for each of said possible corresponding patterns;
selecting as corresponding the pattern having the best likeness; and
in response thereto, recording an indication representative of a lateral inclination of the investigated characteristic of said formation between said paths, said indication being a function of said best likeness and corresponding displacement.

7. A method of investigating characteristics of an earth formation penetrated by a borehole, employing substantially identical transducers traversing different paths on the borehole wall, comprising:
a. producing a first signal from a first measurement transducer mounted on a pad adapted for application against the borehole wall;
b. contemporaneously producing a second signal from a second measurement transducer substantially identical to said first transducer and mounted on said pad alongside said first transducer at a fixed distance therefrom in a plane normal to the direction of movement along the borehole, said first and second signals corresponding to generally identical investigations of formation characteristics immediately adjacent the respective transducers over at least a continuous portion of said borehole and along substantially vertical side-by-side paths at a fixed separation which is less than the radius of the borehole as said pad is moved along said borehole;
c. automatically comparing said first signal and said second signal after said second signal has been depth displaced, to determine the depth displacement along said borehole which corresponds to the best likeness between said signals; and
d. projecting said depth displacement as an indication of the lateral inclination of lateral characteristics of said formation to limit the displacement search range for correlations of signals from other pads spaced around the borehole to determine the dip of laterally homogeneous characteristics of said formation.

8. The method of claim 7 wherein the step of automatically comparing said first and second signals comprises correlating a small interval of said first signal with a number of intervals of said second signal with various depth displacements to provide a number of likeness factors and comparing the provided likeness factors to determine the best likeness factor and its corresponding displacement along said borehole wherein said best likeness factor represents a lateral homogeneity characteristic of said formation between said side-by-side paths and said determined displacement represents the lateral inclination of said characteristic relative to said plane normal to the direction of movement along the borehole.

9. The method of claim 7 wherein said automatically comparing further comprises:
automatically detecting patterns on said first and second signals and correlating a pattern on said first signal with possibly corresponding patterns on said second signal at various displacements from said pattern, said correlation producing likeness factors for each of said possibly corresponding patterns, and
selecting as corresponding the pattern having the best likeness, and applying the corresponding displacement as said indication of the lateral inclination of the lateral characteristic of said formation between said paths.

10. Apparatus for investigating lateral characteristics of an earth formation penetrated by a borehole, comprising:
a. means for producing a first signal comprising a first measurement transducer mounted on a pad adapted for application against the borehole wall;
b. means for producing a second signal contemporaneously with said first signal comprising a second measurement transducer, substantially identical to the first, mounted on said pad at a fixed distance therefrom in a plane normal to the direction of movement along the borehole which is less than the radius of the borehole, said pad and transducers mounted thereon providing substantially vertical side-by-side paths at a fixed separation on said borehole wall as said pad is moved along said borehole, each of said means for producing said first and second signals providing an investigation representative of formation characteristics immediately adjacent the respective transducer over at least a continuous portion of said borehole and along said side-by-side paths, said signals differing when said characteristics adjacent each of said transducers differ;
c. means coupled to said producing means for recording said first and second signals in a manner adapted for comparing their likeness to determine lateral characteristics of said formation between said paths;

d. means coupled to said recording means for automatically comparing said first and second signals over small depth intervals to provide likeness factors with various depth displacements between said signals, said depth displacements corresponding to different depths along the borehole, determining the displacement corresponding to the best likeness and in response thereto recording an indication of lateral characteristics of said earth formation between said side-by-side paths for said depth interval, said indication being a function of said best likeness and determined displacement.

11. Apparatus for investigating lateral characteristics of an earth formation penetrated by a borehole, comprising:

a. means for producing a first signal comprising a first measurement transducer mounted on a pad adapted for application against the borehole wall;

b. means for producing a second signal contemporaneously with said first signal comprising a second measurement transducer, substantially identical to said first transducer, mounted on said pad at a fixed distance therefrom in a plane normal to the direction of movement along the borehole which is less than the radius of the borehole, said pad and transducers mounted thereon providing substantially vertical side-by-side paths at a fixed separation on said borehole wall as said pad is moved along said borehole, said means for producing first and second signals providing generally identical investigations representative of formation characteristics immediately adjacent the respective transducers over at least a continuous portion of said borehole and along said side-by-side paths, said signals differing when said characteristics adjacent each of said transducers differ; and c. means coupled to said producing means for automatically comparing said first and second signals to provide likeness factors with various depth displacements between said signals, said depth displacements corresponding to different depths along said borehole, for determining a displacement corresponding to the best likeness and for recording in response thereto, an indication of lateral characteristics of said earth formation between said side-by-side paths, said indication comprising a function of said best likeness and determined displacement.

12. The apparatus of claim 11 wherein said means for automatically comparing comprises means for correlating a small depth interval of said first signals with a number of intervals of said second signal with various depth displacements corresponding to different depths along the borehole, to provide a number of likeness factors and for comparing the provided likeness factors to determine the best likeness factor and its corresponding displacement wherein said best likeness factor represents a lateral homogeneity characteristic of said formation between said side-by-side paths and said determined displacement represents a lateral inclination of said characteristic relative to said plane normal to the direction of movement along the borehole.

13. The apparatus of claim 11 wherein said means for automatically comparing comprises means for automatically detecting patterns on said first and second signals and correlating a pattern on said first signal with possibly corresponding patterns on said second signal at various depth displacements from said pattern corresponding to various depths along the borehole, said correlation producing likeness factors for each of said possibly corresponding patterns, selecting as corresponding the pattern having the best likeness, and recording an indication which is a function of said best likeness as representative of a lateral homogeneity characteristic and which is a function of the corresponding displacement as representative of the lateral inclination of the investigated characteristic of said formation between said paths.

14. Apparatus for investigating characteristics of an earth formation penetrated by a borehole, employing substantially identical transducers traversing different paths on the borehole wall, comprising:

a. means for producing a first signal from a first measurement transducer mounted on a pad adapted for application against the borehole wall;

b. means for producing a second signal contemporaneously with said first signal from a second measurement transducer substantially identical to said first transducer and mounted on said pad alongside said first transducer at a fixed distance therefrom in a plane normal to the direction of movement along the borehole, said first and second signals corresponding to substantially vertical, generally identical investigations of formation characteristics immediately adjacent the respective transducers over at least a continuous portion of said borehole and along side-by-side paths at a fixed separation which is less than the radius of the borehole as said pad is moved along said borehole; and c. means for automatically comparing said first and second signals to determine the depth displacement corresponding to the best likeness between said signals, said depth displacement corresponding to a different depth along the borehole, and for projecting said depth displacement as an indication of the lateral inclination of lateral characteristics of said formation to limit the displacement search range for correlations of signals from other pads spaced around the borehole to determine the dip of laterally homogeneous characteristics of said formation.

15. The apparatus of claim 14 wherein said means for automatically comparing said first and second signals comprises correlating a small depth interval of said first signal with a number of intervals of said second signal with various depth displacements to provide a number of likeness factors and comparing the provided likeness factors to determine the best likeness factor and its corresponding displacement along said borehole wherein said best likeness factor represents a lateral homogeneity characteristic of said formation between said side-by-side paths and said determined displacement represents the lateral inclination of said characteristic relative to said plane normal to the direction of movement along the borehole.

16. The apparatus of claim 14 wherein said means for automatically comparing further comprises:

means for automatically detecting patterns on said first and second signals and correlating a pattern on said first signal with possibly corresponding patterns on said second signal at various displacements from said pattern, said correlation producing likeness factors for each of said possibly corresponding patterns and selecting as corresponding the pattern having the best likeness, and applying the corresponding displacement as said indication of the lateral inclination of the lateral characteristic of said formation between said paths.

17. Apparatus for investigating lateral characteristics of an earth formation penetrated by a borehole, comprising:
   means for contemporaneously producing first and second measurement signals comprising first and second substantially identical measurement transducers mounted side-by-side at a fixed separation on a pad adapted for movement along the borehole wall, said pad and transducers mounted thereon providing side-by-side paths on the borehole wall at a fixed separation less than the radius of the borehole as said pad is moved along said borehole, said transducers providing substantially vertical, generally identical investigations representative of formation characteristics immediately adjacent said transducers over at least a continuous portion of said borehole and along said side-by-side paths, said signals differing when said characteristics adjacent said transducers differ; and
   means coupled to said producing means for recording said first and second signals in a manner adapted for reproducing said signals for comparing their likeness to determine lateral characteristics of said formation between said paths and
   means for automatically comparing said first and second signals to provide likeness factors with various depth displacements between said signals, said depth displacements corresponding to different depths along said borehole, for determining the displacement corresponding to the best likeness and for recording a function of said best likeness and determined displacement as an indication of lateral characteristics of said earth formation between side-by-side paths.

18. Apparatus for investigating lateral characteristics of an earth formation penetrated by a borehole, employing signals produced from substantially identical measurement transducers traversing different paths on a borehole wall, comprising:
   a. a transducer pad adapted for application against the borehole wall;
   b. a first measurement transducer mounted on said pad for producing a first signal;
   c. a second measurement transducer mounted on said pad for contemporaneously producing a second signal;
   d. said first and second transducers mounted side-by-side on said pad with a fixed known center-to-center separation therebetween to provide side-by-side investigation paths alongside said borehole wall as said pad is moved along said borehole, said transducers having substantially identical construction to provide generally identical, substantially vertical, investigations of formation characteristics over at least a continuous portion of said borehole immediately adjacent each transducer, said first and second signals differing when said characteristics differ between said side-by-side paths; and
   e. means coupled to said transducers for recording said contemporaneous first and second signals in a manner adapted for comparing said signals at a given depth to determine said lateral characteristics of said formation between said side-by-side investivations, for automatically comparing said first and second signals to provide likeness factors with various depth displacements between said signals, said depth displacements corresponding to different depths along said borehole, and for determining the displacement corresponding to the best likeness and in response thereto, recording an indication of lateral characteristics of said earth formation between side-by-side paths which is a function of said best likeness and determined displacement.

19. The apparatus of claim 18 wherein said means for recording further comprises means for automatically comparing said signals by correlating a small depth interval of said first signal with possibly corresponding intervals with various depth displacements on said second signal, said depth displacements corresponding to different depths along said borehole, to provide a likeness factor for each possibly corresponding interval and for comparing the provided likeness factors to determine the best likeness factor and its corresponding displacement wherein said best likeness factor represents a lateral homogeneity characteristic of said formation between said side-by-side paths and said determined displacement represents a lateral inclination of said characteristic relative to said plane normal to the direction of movement along the borehole.

20. The apparatus of claim 18 wherein said means for recording further comprises means for automatically comparing said signals by automatically detecting patterns on said first and second signals and correlating a pattern on said first signal with possibly corresponding patterns on said second signal at various depth displacements from said pattern, said depth displacements corresponding to different depths along said borehole, said correlation producing likeness factors for each of said possibly corresponding patterns, for selecting as corresponding the pattern having the best likeness, and for recording in response thereto, an indication representative of the lateral inclination of the investigated characteristic of said formation between said paths, said indication comprising a function of said best likeness as representative of a lateral homogeneity characteristic and a function of the corresponding displacements.

21. The apparatus of claims 19 or 20 wherein said means for automatically comparing further comprises means for automatically projecting the depth displacement corresponding to the best likeness between signals as an indication of the lateral inclination of lateral characteristics of said formation to limit the displacement search range for correlation of signals from other pads spaced around the borehole to determine the dip of laterally homogeneous characteristics of said formation.

22. The apparatus of claims 19 or 20 wherein said means for automatically comparing further comprises means for projecting said lateral inclination determined between two side-by-side signals produced from one pad to a signal produced from another pad to reduce the correlation interval for said signal used to determine displacements between one of the side-by-side signals from said one pad and said signal from another pad.

23. A method of investigating lateral characteristics of an earth formation penetrated by a borehole, comprising:
   contemporaneously producing first and second signals respectively from substantially identical first and second measurement transducers mounted on a pad adapted for application against the borehole wall, said transducers mounted alongside each other in a plane normal to the direction of movement along the borehole at a fixed center-to-center separation which is less than the radius of the borehole, said pad and transducers providing substantially vertical, side-by-side paths over at least a continuous portion of said borehole at a fixed separation along said borehole wall which is independent of the borehole diameter as said pad and transducers are moved along said borehole, each of said measurement transducers being adapted for providing generally identical investigations representative of formation characteristics immediately adjacent the respective transducer and along the side-by-side paths;

recording said first and second signals in correspondence with movement along said borehole in a manner which is adapted for subsequently comparing their likeness at a given depth to determine lateral changes in characteristics of said formation between said side-by-side paths; and reproducing said recorded first and second signals over a small depth interval and automatically comparing said signal intervals to provide an indication of lateral characteristics between said signals;

wherein said automatically comparing comprises comparing said first and second signal intervals of said signals for various depth displacements therebetween, said depth displacements corresponding to different depths along said borehole, to determine the depth displacement corresponding to the best likeness and in response thereto, recording an indication of lateral characteristics of said earth formation between said paths, said indication being a function of said best likeness and determined displacement.

24. A method of investigating earth formations traversed by a borehole, wherein a first measurement representative of the electrical resistivity of said formations is carried out along a first path on the borehole wall by means of a measurement electrode fixed on a pad capable of being applied against the borehole wall, characterized in that a second measurement representative of the electrical resistivity of said formations is contemporaneously carried out along a second path on said borehole wall by means of a second measurement electrode fixed on said pad, said first and second measurement electrodes being located in the same plane substantially perpendicular to the longitudinal axis of said borehole and separated from each other by a fixed distance which is small compared to the minimum radius of said borehole; said first and second measurements being produced along said paths over a continuous borehole depth interval, and recorded in a manner adapted for correlating said signals with each other to determine the lateral inclination and a homogeneity characteristic for said formations, said lateral inclination being defined in a plane parallel to said longitudinal axis of the borehole and containing said two measurement electrodes; said method further including autocorrelating a given number N of successive signal samples of said first measurement with N successive measurement samples of said second measurement to derive a likeness factor and repeating said correlation for different successive samples of said second measurement having varying depth displacements with said successive samples of said first measurement, said depth displacements corresponding to different depths along said borehole, each of said correlations providing a likeness factor, and determining the best likeness factor and corresponding displacement between said N successive samples of said first and second signals as an indication of lateral characteristics of said formations between said first and second paths on said borehole wall.

25. The method of claim 24 and further including recording a function of said determined best likeness as a characteristic of lateral homogeneity of said formation between said paths.

26. The method of claim 24 and further including recording a function of the displacement corresponding to the determined best likeness as an indication of the lateral inclination of said formation characteristic between said paths.

27. The method of claim 26 and further including producing a third contemporanious measurement by means of a measurement electrode fixed on another pad applied against the borehole wall and projecting said determined lateral inclination to measurement samples of said third measurement and limiting the number of samples from said third measurement applied in successive correlations based on the projection of said lateral inclination between said pads.

28. A dipmeter probe of the type capable of being moved in a borehole and including an elongated probe body member whose longitudinal axis is kept substantially parallel to the axis of said borehole, several pads connected to said probe body member and adapted to move substantially in contact with the wall of said borehole and means for measuring the depth of said probe in said borehole, characterized in that said depth measurement means includes at least two of said pads, not diametrically opposite, and for each of said pads at least two measurement electrodes of small dimensions fixed on the face of the pad in contact with the borehole wall and located in the same plane substantially perpendicular to said longitudinal axis of said probe body member, said measurement electrodes of the same pad making it possible to contemporaneously obtain two series of measurement signals for determining at least one value of the lateral inclination of the formations as seen by the considered pad, said dipmeter further characterized in that, in order to improve the measurement accuracy on the probe depth in the borehole at a given instant and hence the value of the dip, said depth measurement means comprises two electrodes, called "speed electrodes", each fixed on one of said pads in a plane going through one of said measurement electrodes of the considered pad and parallel to said longitudinal axis of the probe body member, the distance between said measurement electrode and said speed electrode of one of said pads being different from the distance between said measurement electrode and said speed electrode of the other of said pads.

* * * * *